United States Patent
Jung et al.

(10) Patent No.: US 11,163,336 B2
(45) Date of Patent: Nov. 2, 2021

(54) FLEXIBLE DISPLAY DEVICE AND METHOD FOR CONTROLLING DISPLAY

(71) Applicant: Samsung Electronics Co., Ltd., Gyeonggi-do (KR)

(72) Inventors: Songhee Jung, Gyeonggi-do (KR); Taesung Kim, Gyeonggi-do (KR); Hyunchang Shin, Gyeonggi-do (KR); Donghui Kim, Gyeonggi-do (KR); Jongkon Bae, Seoul (KR); Dongkyoon Han, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/070,384

(22) PCT Filed: Jan. 18, 2017

(86) PCT No.: PCT/KR2017/000614
§ 371 (c)(1),
(2) Date: Jul. 16, 2018

(87) PCT Pub. No.: WO2017/126886
PCT Pub. Date: Jul. 27, 2017

(65) Prior Publication Data
US 2019/0018454 A1    Jan. 17, 2019

(30) Foreign Application Priority Data
Jan. 18, 2016  (KR) .......... 10-2016-0006021

(51) Int. Cl.
*G06F 1/16* (2006.01)
*H04M 1/02* (2006.01)
(Continued)

(52) U.S. Cl.
CPC .......... *G06F 1/1652* (2013.01); *G06F 1/1616* (2013.01); *G06F 1/1641* (2013.01);
(Continued)

(58) Field of Classification Search
CPC .... G06F 1/1652; G06F 1/1616; G06F 1/1643; G06F 1/1641; H04M 1/0214; H04M 1/0216; H04M 1/0268
See application file for complete search history.

(56) References Cited

U.S. PATENT DOCUMENTS 8,804,349 B2 *  8/2014  Lee ............... H04M 1/0268
                                                361/749
9,189,016 B2 * 11/2015  Jang .............. G06F 1/1637
(Continued)

FOREIGN PATENT DOCUMENTS

KR  1020080035709   4/2008
KR  1020100092220   8/2010
(Continued)

OTHER PUBLICATIONS

PCT/ISA/210 Search Report issued on PCT/KR2017/000614 (pp. 3).
PCT/ISA/237 Written Opinion issued on PCT/KR2017/000614 (pp. 7).

*Primary Examiner* — Nidhi Thaker
(74) *Attorney, Agent, or Firm* — The Farrell Law Firm, P.C.

(57) ABSTRACT

An electronic device may comprise: a first housing including a first upper surface, a first lower surface, a first side, and a second side disposed opposite the first side; a second housing including a third side and a second upper surface; a connecting member for connecting the first housing and the second housing to be rotatable; a first window extending from the first upper surface to the first side and formed of a first material; a second window extending from the first lower surface of the first housing to the second upper surface and formed of a second material; and a flexible display mounted in the first housing and the second housing and mounted along the first window and the second window.

19 Claims, 50 Drawing Sheets

(51) Int. Cl.
*G09F 9/30* (2006.01)
*G09G 3/20* (2006.01)

(52) U.S. Cl.
CPC .......... G06F 1/1643 (2013.01); G06F 1/1677 (2013.01); H04M 1/0214 (2013.01); H04M 1/0216 (2013.01); H04M 1/0268 (2013.01); *G06F 1/1662* (2013.01); *G06F 2203/04803* (2013.01); *G09F 9/30* (2013.01); *G09G 3/20* (2013.01); *H04M 2250/16* (2013.01)

(56) References Cited

U.S. PATENT DOCUMENTS

| | | | | |
|---|---|---|---|---|
| 9,779,653 B2* | 10/2017 | Ikeda | .................... | G09G 3/3208 |
| 2003/0142037 A1* | 7/2003 | Pinedo | .................. | G06F 3/1423 |
| | | | | 345/1.1 |
| 2004/0222943 A1* | 11/2004 | Kudo | ..................... | G06F 3/147 |
| | | | | 345/1.1 |
| 2009/0021666 A1* | 1/2009 | Chen | ................. | G02F 1/133305 |
| | | | | 349/58 |
| 2010/0201603 A1 | 8/2010 | Kee et al. | | |
| 2010/0277665 A1 | 11/2010 | Kuo et al. | | |
| 2012/0002360 A1 | 1/2012 | Seo et al. | | |
| 2013/0194761 A1* | 8/2013 | Kim | .................... | G06F 1/1652 |
| | | | | 361/749 |
| 2014/0111954 A1 | 4/2014 | Lee et al. | | |
| 2014/0218321 A1* | 8/2014 | Lee | ....................... | G06F 1/1643 |
| | | | | 345/173 |
| 2016/0224066 A1* | 8/2016 | Hussa | ................. | G02F 1/133308 |
| 2017/0115701 A1* | 4/2017 | Bae | ........................... | G06F 1/16 |

FOREIGN PATENT DOCUMENTS

| | | |
|---|---|---|
| KR | 1020120002084 | 1/2012 |
| KR | 1020140050504 | 4/2014 |
| KR | 1020140099133 | 8/2014 |

* cited by examiner

FLEXIBLE DISPLAY DEVICE AND METHOD FOR CONTROLLING DISPLAY

PRIORITY

This application is a National Phase Entry of PCT International Application No. PCT/KR2017/000614 which was filed on Jan. 18, 2017, and claims priority to Korean Patent Application No. 10-2016-0006021, which was filed on Jan. 18, 2016, the content of each of which is incorporated herein by reference.

TECHNICAL FIELD

Various embodiments of the present invention relate to a flexible display device and, more particularly, to a structure that mounts a flexible display in an electronic device and a method of controlling a display.

BACKGROUND ART

Nowadays, products using flexible displays in electronic devices are being launched. The flexible displays may be mounted in various forms in electronic devices because of a characteristic of free bending; therefore, a display area may be extended to the left or right side as well as to the front of the electronic device. Further, when a flexible display is mounted in a foldable electronic device, if the electronic device is folded and unfolded, the flexible display may be folded and unfolded together with the electronic device.

DISCLOSURE OF INVENTION

Technical Problem

When the flexible display is mounted in a foldable electronic device, if the electronic device is folded and unfolded, the flexible display may be also folded and unfolded. In a state in which the electronic device is folded, information may not be determined. In order to determine information, when the electronic device is continuously folded and unfolded, a problem may occur in durability of a flexible display area corresponding to a rotating portion of the electronic device.

An electronic device according to various embodiments of the present invention may provide a structure of mounting a flexible display in an electronic device and a method of controlling a display in order to determine information even in a state in which the electronic device is folded using a single flexible display.

Solution to Problem

An electronic device according to various embodiments of the present invention includes a first housing including a first upper surface, a first lower surface, a first side surface, and a second side surface disposed at the opposite side of the first side surface; a second housing including a third side surface and a second upper surface; a connection member configured to rotatably connect the first housing and the second housing; a first window extended from the first upper surface to the first side surface and made of a first material; a second window extended from the first lower surface to the second upper surface and made of a second material; and a flexible display mounted in the first housing and the second housing and mounted along the first window and the second window. The first material may be harder than the second material. The first material may include plastic or glass, and the second material may include a film. At least a partial area of the second window corresponding to a connection area of the second side surface and the third side surface may be folded according to a rotation of the first housing and the second housing by the connection member. A plane of the first window may be positioned lower than that of the first housing. An area of the flexible display corresponding to the first side surface may be fixed to a form bent to the outside to be mounted in the first side surface. An area of the flexible display corresponding to the second side surface and the third side surface may be mounted in the first lower surface and the second upper surface so as to fold. In at least a partial area of the first upper surface, a keyboard may be mounted. The connection member may be integrally formed with the first housing or the second housing. The electronic device may have a folding state in which the first lower surface of the first housing and the second upper surface of the second housing are folded to face about the connection member or an unfolding state in which the first lower surface of the first housing and the second upper surface of the second housing are unfolded to position on a single plane. In a state in which the electronic device is folded, a flexible display area corresponding to the first upper surface and the first side surface may be exposed to the outside.

In a state in which the electronic device is folded, the electronic device may be configured to activate a screen in at least a portion of a flexible display area corresponding to the first upper surface and to deactivate a screen in a flexible display area corresponding to the first lower surface and the second upper surface.

According to various embodiments, in a state in which the electronic device is folded, the electronic device may be configured to activate a flexible display area corresponding to the first side surface and to deactivate a flexible display area corresponding to the first lower surface and the second upper surface.

The electronic device may further include a single display driver circuit configured to drive the flexible display, wherein the display driver circuit may include a gate driver and a source driver; and a processor, wherein the processor may be configured to activate a flexible display area corresponding to the first upper surface using the source driver and to deactivate a screen corresponding to the first lower surface and the second upper surface using the source driver.

The electronic device may further include a single display driver circuit configured to drive the flexible display, wherein the display driver circuit may include a gate driver and a source driver, and wherein the electronic device may be configured to activate a screen in a flexible display area corresponding to the first upper surface and to deactivate a screen corresponding to the first lower surface and the second upper surface using the gate driver.

The electronic device may further include a first display driver circuit and a second display driver circuit configured to drive the flexible display, wherein the electronic device may be configured to activate a screen in a flexible display area corresponding to the first upper surface using the first display driver circuit, and the electronic device may be configured to deactivate a screen corresponding to the first lower surface and the second upper surface using the second display driver circuit. The first display driver circuit may be configured to activate a screen in a flexible display screen area corresponding to the first side surface.

An electronic device according to various embodiments includes a first housing including a first upper surface, a first side surface, and a first lower surface; a second housing rotatably connected to the first housing and including a second upper surface; a flexible display mounted to cover the first upper surface and the first side surface of the first housing and the second upper surface of the second housing; a first window configured to cover a sub-area of the flexible display corresponding to the first upper surface and the first side surface of the first housing; and a second window configured to cover a main area of the flexible display corresponding to the first lower surface of the first housing and the second upper surface of the second housing. The first window may be made of a material harder than that of the second window. The sub-area and the main area may be driven independently.

Advantageous Effects of Invention

According to various embodiments, even in a state in which an electronic device is folded, information can be determined using a single flexible display.

According to various embodiments, by using a different material of a window disposed at a front surface of a flexible display, solidity and flexibility can be simultaneously satisfied.

According to various embodiments, in a state in which an electronic device is folded, an electronic device can display information in a flexible display area exposed to the outside and turn off a screen in a flexible display area that is not exposed to the outside, thereby reducing power consumption.

MODE FOR THE INVENTION

Figure 1:
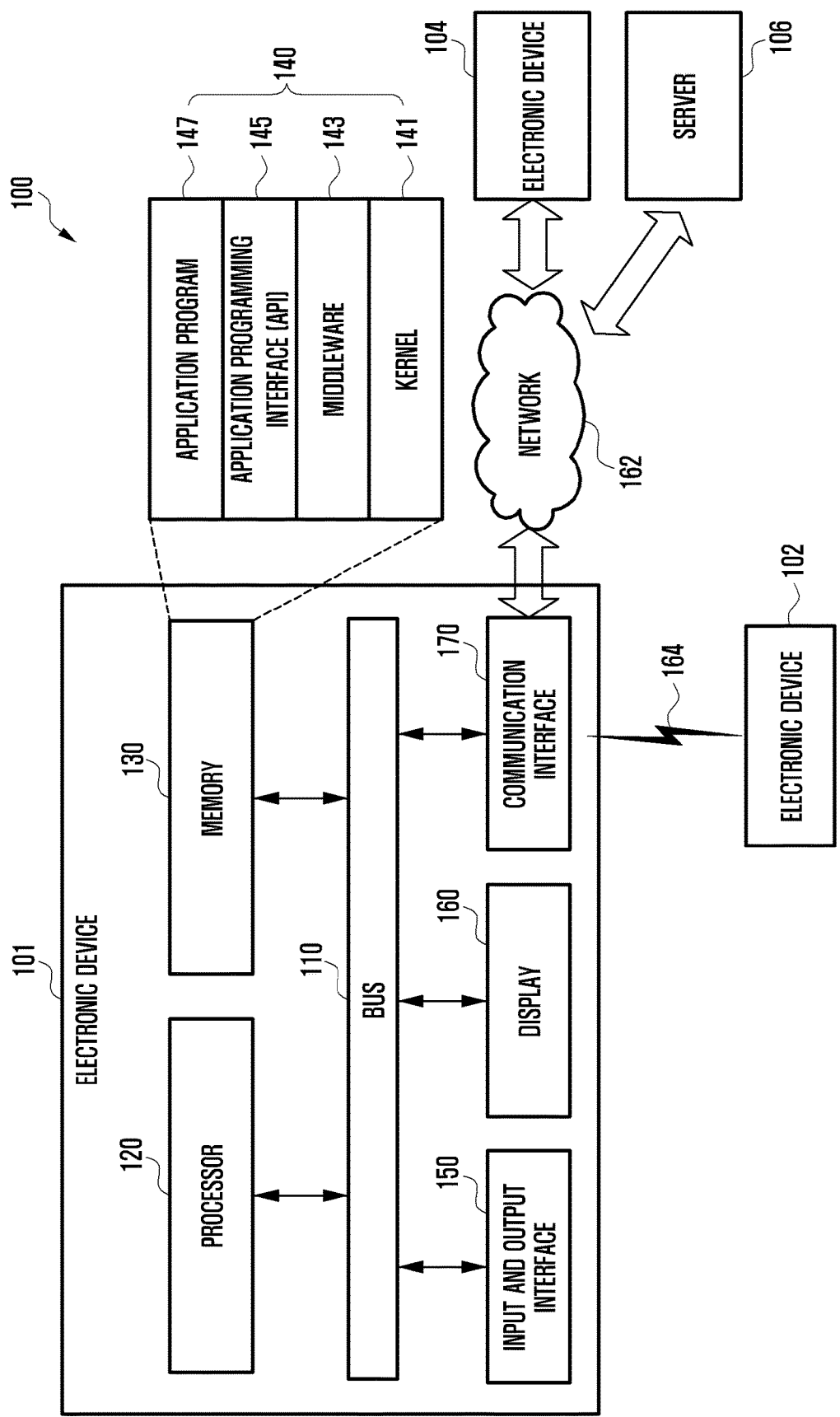
FIG. 1 is a block diagram illustrating an electronic device and a network according to various embodiments of the present invention.

Hereinafter, various embodiments of this document will be described in detail with reference to the accompanying drawings. It should be understood that embodiments and terms used in the embodiments do not limit technology described in this document to a specific embodiment and include various changes, equivalents, and/or replacements of a corresponding embodiment. The same reference numbers are used throughout the drawings to refer to the same or like parts. Unless the context otherwise clearly indicates, words used in the singular include the plural, and the plural includes the singular.

In this document, an expression such as "A or B" and "at least one of A or/and B" may include all possible combinations of the together listed items. An expression such as "first" and "second" used in this document may indicate corresponding constituent elements regardless of order and/or importance, and such an expression is used for distinguishing a constituent element from another constituent element and does not limit any corresponding constituent element. When it is described that a constituent element (e.g., a first constituent element) is "(functionally or communicatively) coupled to" or is "connected to" another constituent element (e.g., a second constituent element), it should be understood that the constituent element may be directly connected to the another constituent element or may be connected to the another constituent element through another constituent element (e.g., a third constituent element).

In this document, "configured to (or set to)" may be interchangeably used in hardware and software with, for example, "appropriate to", "having a capability to", "changed to", "made to", "capable of", or "designed to" according to a situation. In any situation, an expression "device configured to" may mean that the device is "capable of" being configured together with another device or component. For example, a phrase "processor configured to (or set to) perform A, B, and C" may mean an exclusive processor (e.g., an embedded processor) for performing a corresponding operation or a generic-purpose processor (e.g., CPU or application processor) that can perform a corresponding operation by executing at least one software program stored at a memory device.

An electronic device according to various embodiments of this document may include at least one of, for example, a smart phone, tablet personal computer (PC), mobile phone, video phone, electronic book reader, desktop PC, laptop PC, netbook computer, workstation, server, personal digital assistant (PDA), portable multimedia player (PMP), MP3 player, medical device, camera, and wearable device. The wearable device may include at least one of an accessory type device (e.g., watch, ring, bracelet, ankle bracelet, necklace, glasses, contact lens), head-supported-device (HMD), textile or clothing integral type device (e.g., electronic clothing), body attachment type device (e.g., skin pad or tattoo), and bio implantable circuit. In some embodiments, the electronic device may include at least one of, for example, a television, digital video disk (DVD) player, audio device, refrigerator, air-conditioner, cleaner, oven, microwave oven, washing machine, air cleaner, set-top box, home automation control panel, security control panel, media box (e.g., Samsung HomeSync™, AppleTV™, or Google TV™), game console (e.g., Xbox™, PlayStation™), electronic dictionary, electronic key, camcorder, and electronic frame.

In another embodiment, the electronic device may include at least one of various medical devices (e.g., various portable medical measurement devices (blood sugar measurement device, heartbeat measurement device, blood pressure measurement device, or body temperature measurement device), magnetic resonance angiography (MRA) device, magnetic resonance imaging (MRI) device, computed tomography (CT) device, scanning machine, and ultrasonic wave device), navigation device, global navigation satellite system (GNSS), event data recorder (EDR), flight data recorder (FDR), vehicle infotainment device, ship electronic equipment (e.g., ship navigation device, gyro compass), avionics, security device, vehicle head unit, industrial or home robot, drone, automatic teller machine (ATM) of a financial institution, point of sales (POS) of store, and Internet of things (e.g., bulb, various sensors, sprinkler, fire alarm, thermostat, street light, toaster, exercise device, hot water tank, heater, boiler). According to some embodiments, the electronic device may include at least one of furniture, a portion of a building/structure or a vehicle, electronic board, electronic signature receiving device, projector, and various measurement devices (e.g., water supply, electricity, gas, or electric wave measurement device). In various embodiments, the electronic device may be flexible or may be two or more combinations of the foregoing various devices. An electronic device according to an embodiment of this document is not limited to the foregoing devices. In this document, a term "user" may indicate a person using an electronic device or a device (e.g., artificial intelligence electronic device) using an electronic device.

FIG. 1 is a block diagram illustrating an electronic device 101 in a network environment 100 according to various embodiments.

With reference to FIG. 1, the electronic device 101 may include a bus 110, processor 120, memory 130, input and output interface 150, display 160, and communication interface 170. In some embodiments, the electronic device 101 may omit at least one of these constituent elements or may additionally have another constituent element.

The bus 110 may connect, for example, constituent elements 120-170 to each other and include a circuit that transfers communication (e.g., control message or data) between constituent elements.

The processor 120 may include at least one of a central processing unit (CPU), application processor (AP), and communication processor (CP). The processor 120 may execute, for example, calculation or data processing of the control and/or communication of at least one another constituent element of the electronic device 101.

The memory 130 may include a volatile memory and/or a nonvolatile memory. The memory 130 may store, for example, a command or data related to at least one other constituent element of the electronic device 101. According to an embodiment, the memory 130 may store software and/or a program 140. The program 140 may include, for example, a kernel 141, middleware 143, application programming interface (API) 145, and/or application program (or "application") 147.

At least a portion of the kernel 141, the middleware 143, and the API 145 may be referred to as an operating system (OS). The kernel 141 may control or manage, for example, system resources (e.g., the bus 110, the processor 120, or the memory 130) used for executing an operation or a function implemented in other programs (e.g., the middleware 143, the API 145, or the application program 147). Further, by accessing from the middleware 143, the API 145, and the application program 147 to an individual constituent element of the electronic device 101, the kernel 141 may provide an interface that can control or manage system resources.

The middleware 143 may perform, for example, an intermediary function of transmitting and receiving data by enabling the API 145 or the application program 147 to communicate with the kernel 141. Further, the middleware 143 may process at least one work request received from the application program 147 according to a priority. For example, the middleware 143 may give a priority for use of a system resource (e.g., the bus 110, the processor 120, or the memory 130) of the electronic device 101 to at least one of the application programs 147 and process the at least one work request.

The API 145 is an interface that enables the application program 147 to control a function that the kernel 141 or the middleware 143 provides and may include, for example, at least one interface or function (e.g., instruction) for a file control, window control, image processing, or text control. The input and output interface 150 may transfer, for example, a command or data input from a user or another external device to another component(s) of the electronic device 101 or may output a command or data received from another component(s) of the electronic device 101 to a user or another external device.

The display 160 may include, for example, a liquid crystal display (LCD), light emitting diode (LED) display, organic light emitting diode (OLED) display, microelectromechanical system (MEMS) display, or electronic paper display. The display 160 may display, for example, various contents (e.g., text, image, video, icon, and/or symbol) to a user. The display 160 may include a touch screen and may receive, for example, a touch, gesture, proximity, or hovering input using a portion of a user body or an electronic pen. The communication interface 170 may set, for example, communication between the electronic device 101 and an external device (e.g., a first external electronic device 102, second external electronic device 104, or server 106). For example, the communication interface 170 may be connected to a network 162 through wireless communication or wire communication to communicate with an external device (e.g., the second external electronic device 104 or the server 106).

Wireless communication may include cellular communication that uses at least one of, for example, long-term evolution (LTE), LTE advance (LTE-A), code division multiple access (CDMA), wideband CDMA (WCDMA), universal mobile telecommunications system (UMTS), wireless broadband (WiBro), and global system for mobile communications (GSM). According to an embodiment, wireless communication may include, for example, at least one of wireless fidelity (WiFi), Bluetooth, Bluetooth low energy (BLE), Zigbee, near field communication (NFC), magnetic secure transmission, radio frequency (RF), and body area network (BAN).

According to an embodiment, wireless communication may include a global navigation satellite system (GNSS). The GNSS may be, for example, a global positioning system (GPS), global navigation satellite system (Glonass), Beidou navigation satellite system (hereinafter "Beidou") or Galileo, and European global satellite-based navigation system. Hereinafter, in this document, "GPS" may be interchangeably used with "GNSS". The wire communication may include at least one of, for example, a universal serial bus (USB), a high definition multimedia interface (HDMI), recommended standard 232 (RS-232), power line communication, and a plain old telephone service (POTS). The network 162 may include at least one of a telecommunication network, for example, a computer network (e.g., LAN or WAN), Internet, and a telephone network.

The first and second external electronic devices 102 and 104 each may be a device of the same kind as or a kind different from that of the electronic device 101. According to various embodiments, all or some of the operations executed in the electronic device 101 may be executed in another one electronic device or a plurality of electronic devices (e.g., the electronic devices 102 and 104 or the server 106). According to an embodiment, when the electronic device 101 should perform any function or service automatically or by a request, additionally or instead of executing a function or a service, the electronic device 101 may request at least a partial function related thereto to another device (e.g., the electronic devices 102 and 104 or the server 106). Another electronic device (e.g., the electronic devices 102 and 104 or the server 106) may execute a requested function or an additional function and transmit a result thereof to the electronic device 101. The electronic device 101 may provide a received result itself or a requested function or service by additional processing. For this purpose, for example, cloud computing, distributed computing, or client-server computing technology may be used.

Figure 2:
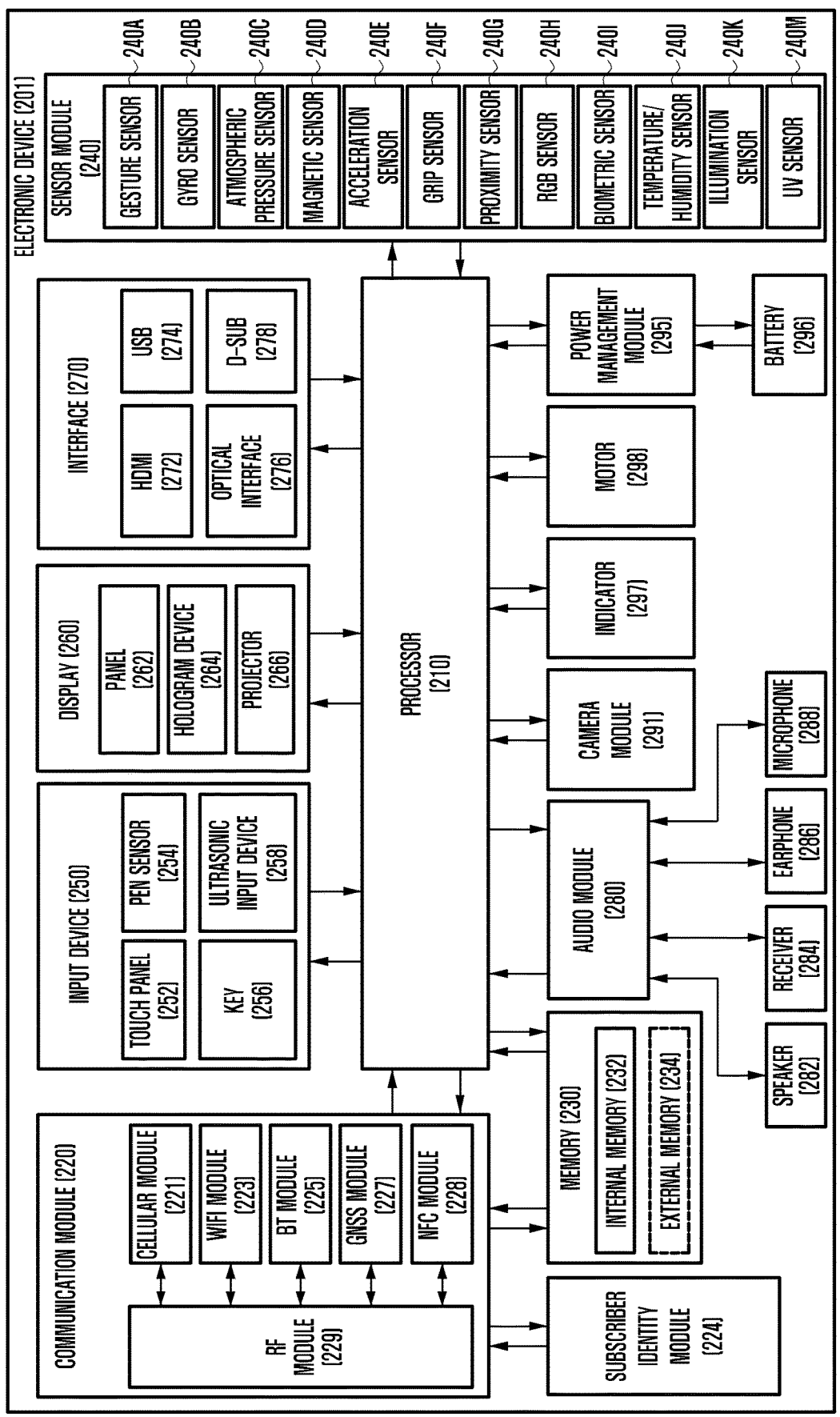
FIG. 2 is a block diagram illustrating a configuration of an electronic device according to various embodiments of the present invention.

FIG. 2 is a block diagram illustrating a configuration of an electronic device 201 according to various embodiments.

With reference to FIG. 2, the electronic device 201 may include, for example, all or some of the electronic device 101 of FIG. 1. The electronic device 201 may include at least one processor (e.g., AP) 210, communication module 220, memory 230, sensor module 240, input device 250, display 260, interface 270, audio module 280, camera module 291, power management module 295, battery 296, indicator 297, and motor 298.

By driving, for example, an operation system or an application program, the processor 210 may control a plurality of hardware or software components connected thereto and perform various data processing and calculation tasks. The processor 210 may be implemented into, for example, a system on chip (SoC). According to an embodiment, the processor 210 may further include a graphic processing unit (GPU) and/or an image signal processor. The processor 210 may include at least some (e.g., a cellular module 221) of constituent elements of FIG. 2. The processor 210 may load and process a command or data received from at least one of other constituent elements (e.g., a nonvolatile memory) at a volatile memory and store result data at the nonvolatile memory.

The communication module 220 may have the same configuration as or a configuration similar to that of the communication interface 170 of FIG. 1. The communication module 220 may include, for example, a cellular module 221, WiFi module 223, Bluetooth (BT) module 225, global navigation satellite system (GNSS) module 227, near field communication (NFC) module 228, and radio frequency (RF) module 229. The cellular module 221 may provide, for example, audio dedicated communication, audiovisual communication, a text service, or an Internet service through a communication network. According to an embodiment, the cellular module 221 may perform identification and authentication of the electronic device 201 within a communication network using a subscriber identity module (e.g., subscriber identification module (SIM) card) 224. According to an embodiment, the cellular module 221 may perform at least a partial function of functions that the processor 210 may provide.

According to an embodiment, the cellular module 221 may include a communication processor (CP). According to some embodiments, at least some (e.g., two or more) of the cellular module 221, the WiFi module 223, the BT module 225, the GNSS module 227, and the NFC module 228 may be included in one integrated chip (IC) or an IC package. The RF module 229 may transmit and receive, for example, a communication signal (e.g., an RF signal). The RF module 229 may include, for example, a transceiver, power amp module (PAM), frequency filter, low noise amplifier (LNA), or antenna. According to another embodiment, at least one of the cellular module 221, WiFi module 223, BT module 225, GNSS module 227, and NFC module 228 may transmit and receive an RF signal through a separate RF module. The subscriber identity module 224 may include, for example, an embedded SIM or a card including a subscriber identity module, and it may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of, for example, a volatile memory (e.g., dynamic read-only memory (DRAM), static read-only memory (SRAM), synchronous dynamic read-only memory (SDRAM)), nonvolatile memory (e.g., one time programmable ROM (OTPROM)), programmable read-only memory (PROM), erasable programmable read only memory (EPROM), electrically erasable and programmable read only memory (EEPROM), mask ROM, flash ROM, flash memory, hard drive, and solid state drive (SSD). The external memory 234 may include a flash drive, for example, compact flash (CF), secure digital (SD), micro-SD, mini-SD, extreme digital (xD), multi-media card (MMC), or memory stick. The external memory 234 may be functionally or physically connected to the electronic device 201 through various interfaces.

The sensor module 240 may measure, for example, a physical quantity or detect an operation state of the electronic device 201 and convert measured or detected information to an electric signal. The sensor module 240 may include at least one of, for example, a gesture sensor 240A, gyro sensor 240B, atmospheric pressure sensor 240C, magnetic sensor 240D, acceleration sensor 240E, grip sensor 240F, proximity sensor 240G, color sensor 240H (e.g., red, green, and blue (RGB) sensor), biometric sensor 240I, temperature/humidity sensor 240J, illumination sensor 240K, and ultraviolet (UV) sensor 240M.

Additionally or alternatively, the sensor module 240 may include, for example, an e-nose sensor, electromyograph (EMG) sensor, electroencephalogram (EEG) sensor, electrocardiogram (ECG) sensor, infrared (IR) sensor, iris sensor, and/or fingerprint sensor. The sensor module 240 may further include a control circuit for controlling at least one sensor that belongs therein. In some embodiments, the electronic device 201 further includes a processor configured to control the sensor module 240 as a portion of the processor 210 or separately from the processor 210; and, when the processor 210 is in a sleep state, the electronic device 201 may control the sensor module 240.

The input device 250 may include, for example, a touch panel 252, (digital) pen sensor 254, key 256, or ultrasonic input device 258. The touch panel 252 may use at least one method of, for example, capacitive, resistive, infrared ray, and ultrasonic wave methods. Further, the touch panel 252 may further include a control circuit. The touch panel 252 may further include a tactile layer to provide a tactile response to a user. According to an embodiment, the touch panel 252 may include a pressure sensor (or a force sensor) that can measure pressure strength of a user touch. The pressure sensor may be integrally implemented with the touch panel 252 or may be implemented into at least one sensor separate from the touch panel 252.

The (digital) pen sensor 254 may be, for example, a portion of a touch panel or may include a separate recognition sheet. The key 256 may include, for example, a physical button, optical key, or key pad. The ultrasonic input device 258 may detect ultrasonic waves generated in an input instrument through a microphone (e.g., a microphone 288) to determine data corresponding to the detected ultrasonic wave.

The display 260 (e.g., the display 160) may include a panel 262, hologram device 264, projector 266, and/or control circuit for controlling them. The panel 262 may be implemented with, for example, a flexible, transparent, or wearable method. The panel 262 and the touch panel 252 may be formed in at least one module. The hologram device 264 may show a stereoscopic image in the air using interference of light. The projector 266 may project light on a screen to display an image. The screen may be positioned, for example, at the inside or the outside of the electronic device 201. The interface 270 may include, for example, a high definition multimedia interface (HDMI) 272, universal serial bus (USB) 274, optical interface 276, or D-subminiature (D-sub) 278. The interface 270 may be included in, for example, the communication interface 170 of FIG. 1. Additionally or alternatively, the interface 270 may include, for example, a mobile high-definition link (MHL) interface, secure digital (SD) card/multi-media card (MMC) interface, or infrared data association (IrDA) specification interface.

The audio module 280 may bilaterally convert, for example, a sound and an electric signal. At least a partial constituent element of the audio module 280 may be included, for example, in the input and output interface 150 of FIG. 1. The audio module 280 may process sound information that is input or output through, for example, a speaker 282, receiver 284, earphone 286, or microphone 288. The camera module 291 may photograph, for example, a still picture and a moving picture and include at least one image sensor (e.g., a front surface lens or a rear surface lens), a lens, an image signal processor (ISP), or a flash (e.g., a light emitting diode (LED) or a xenon lamp) according to an embodiment. The power management module 295 may manage power of, for example, the electronic device 201. According to an embodiment, the power management module 295 may include a power management integrated circuit (PMIC), charge integrated circuit (IC), battery, or fuel gauge. The PMIC may have a wired and/or wireless charge method. The wireless charge method may include, for example, a magnetic resonance method, magnetic induction method, or electromagnetic wave method and may further include an additional circuit, for example, a coil loop, resonant circuit, and rectifier for wireless charge. The battery gauge may measure, for example, a residual quantity of the battery 296, a voltage, a current, or a temperature while charging. The battery 296 may include, for example, a rechargeable battery and/or a solar battery.

The indicator 297 may display a specific state, for example, a booting state, a message state, or a charge state of the electronic device 201 or some component (e.g., the processor 210) thereof. The motor 298 may convert an electric signal to a mechanical vibration and generate a vibration or a haptic effect. The electronic device 201 may include, for example, a mobile TV support device (e.g., GPU) that can process media data according to a specification such as digital multimedia broadcasting (DMB), digital video broadcasting (DVB), or mediaFlo™. The elements each described in this document may be configured with at least one component, and a name of a corresponding element may be changed according to a kind of the electronic device. In various embodiments, some constituent elements of the electronic device (e.g., the electronic device 201) may be omitted, the electronic device may further include an additional constituent element, or some constituent elements may be coupled to configure one entity, thereby performing a function of corresponding constituent elements before coupling.

Figure 3:
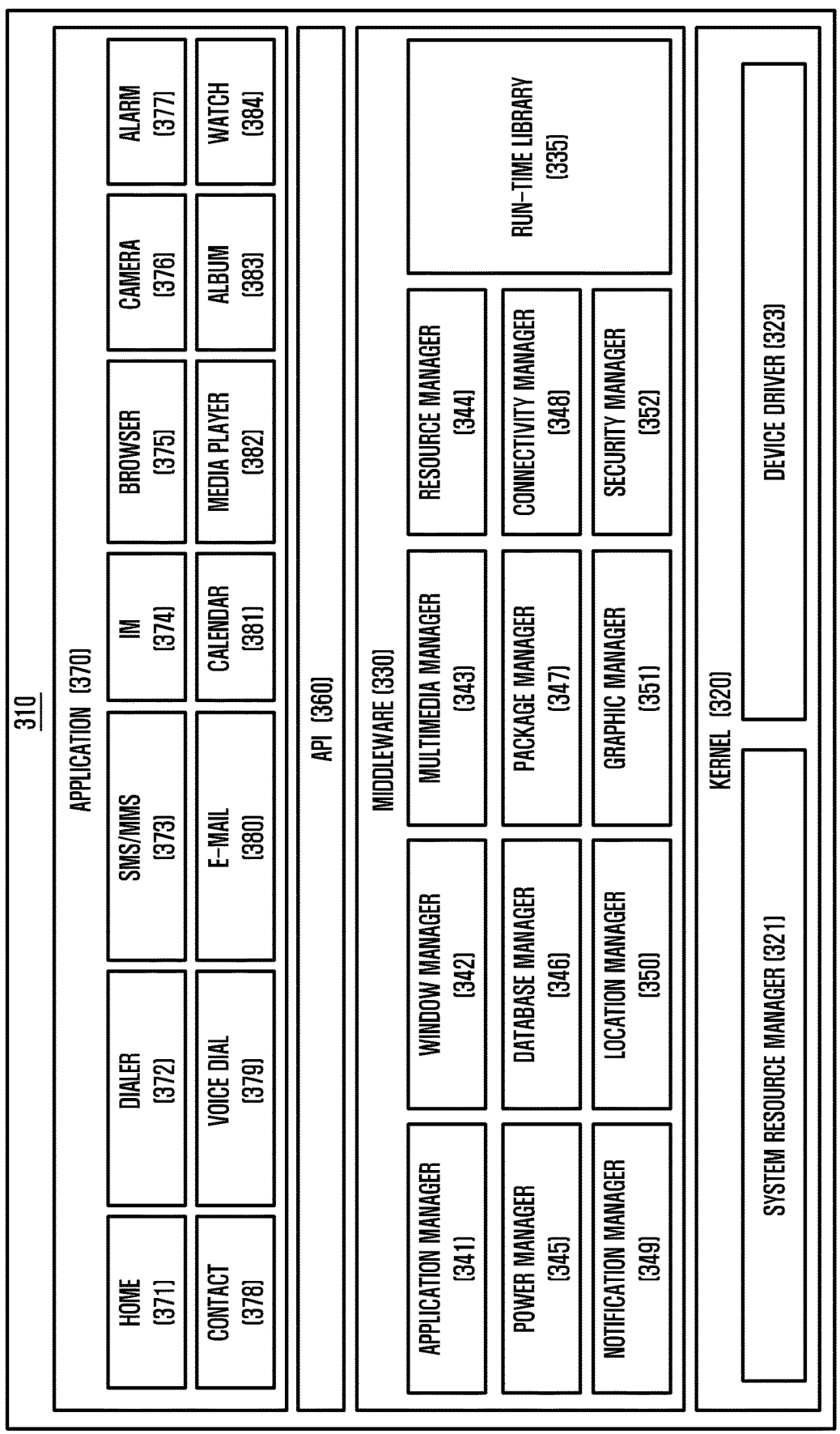
FIG. 3 is a block diagram illustrating a configuration of a program module according to various embodiments.

FIG. 3 is a block diagram illustrating a configuration of a program module according to various embodiments of the present invention.

With reference to FIG. 3, a program module 310 (e.g., the program 140) may include an operating system for controlling resources related to an electronic device (e.g., the electronic device 101) and/or various applications (e.g., the application program 147) driven on the operating system. The operation may include, for example, Android™, iOS™, Windows™, Symbian™, Tizen™, or Bada™. With reference to FIG. 3, the program module 310 may include a kernel 320 (e.g., the kernel 141), middleware 330 (e.g., the middleware 143), API 360 (e.g., the API 145), and/or application 370 (e.g., the application program 147). At least some of the program module 310 may be pre-loaded on the electronic device or may be downloaded from an external electronic device (e.g., the electronic devices 102 and 104 and the server 106)

The kernel 320 may include, for example, a system resource manager 321 and/or a device driver 323. The system resource manager 321 may control, allocate, or recover a system resource. According to an embodiment, the system resource manager 321 may include a process management unit, a memory management unit, or a file system management unit. The device driver 323 may include, for example, a display driver, camera driver, Bluetooth driver, sharing memory driver, universal serial bus (USB) driver, keypad driver, WiFi driver, audio driver, or inter-process communication (IPC) driver.

The middleware 330 may provide, for example, a function that the application 370 commonly requires or may provide various functions to the application 370 through the API 360 so that the application 370 uses a limited system resource within the electronic device. According to an embodiment, the middleware 330 may include at least one of a run-time library 335, application manager 341, window manager 342, multimedia manager 343, resource manager 344, power manager 345, database manager 346, package manager 347, connectivity manager 348, notification manager 349, location manager 350, graphic manager 351, and security manager 352.

In order to add a new function through a programming language, for example, while the application 370 is being executed, the run-time library 335 may include a library module that a compiler uses. The run-time library 335 may perform input and output management, memory management, or arithmetic function processing. The application manager 341 may manage, for example, a life cycle of the application 370. The window manager 342 may manage GUI resources used in a screen. The multimedia manager 343 may determine a format required for reproduction of media files and perform encoding or decoding of media files using a codec corresponding to the format.

The resource manager 344 may manage a source code of the application 370 or a space of the memory. The power manager 345 may manage, for example, a capacity or power of the battery and provide power information necessary for an operation of the electronic device. According to an embodiment, the power manager 345 may be interworked with a basic input/output system (BIOS). The database manager 346 may generate, retrieve, or change, for example, a database to be used in the application 370. The package manager 347 may manage installation or update of an application distributed in a format of a package file.

The connectivity manager 348 may manage, for example, a wireless connection. The notification manager 349 may provide, for example, an event such as an arrival message, appointment, and proximity notification to a user. The location manager 350 may manage, for example, location information of the electronic device. The graphic manager 351 may manage, for example, a graphic effect to be provided to a user or a user interface related thereto. The security manager 352 may provide, for example, system security or user authentication. According to an embodiment, the middleware 330 may include a middleware module that can form a combination of functions of the above-described components or a telephony manager for managing an audio dedicated call or audiovisual call function of the electronic device.

According to an embodiment, the middleware 330 may provide a module specified for each kind of an operating system. Further, the middleware 330 may dynamically delete some of existing constituent elements or add new constituent elements. The API 360 may be provided with another configuration according to an operation system with, for example, a set of API programming functions. For example, in Android or iOS, a single API set may be provided for each platform, and in Tizen, at least two API sets may be provided for each platform.

The application 370 may include, for example, a home 371, dialer 372, short message service (SMS)/multimedia messaging service (MMS) 373, instant message (IM) 374, browser 375, camera 376, alarm 377, contact 378, voice dial 379, email 380, calendar 381, media player 382, album 383, watch 384, health care (e.g., measurement of an exercise amount or blood sugar), or environmental information (atmospheric pressure, humidity, or temperature information) providing application. According to an embodiment, the application 370 may include an information exchange application that can support information exchange between the electronic device and the external electronic device. The information exchange application may include, for example, a notification relay application for transmitting specific information to an external electronic device or a device management application for managing an external electronic device.

For example, the notification transfer application may transfer notification information generated in other applications of the electronic device to an external electronic device or may receive notification information from the external electronic device to provide the notification information to the user. For example, the device management application may install, remove, or update functions (e.g., turn on/turn off of the external electronic device itself (or some components) or control brightness (or resolution) of the display) of the external electronic device communicating with the electronic device or an application operating in the external electronic device. According to an embodiment, the application 370 may include a designated application (e.g., a healthcare application of a mobile medical device) according to a property of the external electronic device. According to an embodiment, the application 370 may include an application received from the external electronic device. At least some of the program module 310 may be implemented (e.g., executed) into software, firmware, hardware (e.g., the processor 210), or a combination of at least two thereof and include a module, program, routine, instruction set, or process for performing at least one function.

Hereinafter, a gate driver may mean a gate control circuit, an emission driver may mean an emission control circuit, and a source driver may mean a source control circuit.

FIGS. 4A to 6C are diagrams illustrating a configuration example of an electronic device according to various embodiments of the present invention.

The electronic device may include a first housing including a first upper surface, a first side surface, and a first lower surface; a second housing rotatably connected to the first housing and including a second upper surface; a flexible display mounted to cover the first upper surface, the first side surface, and the first lower surface of the first housing and the second upper surface of the second housing; a first window that covers a sub-area of the flexible display corresponding to the first upper surface and the first side surface of the first housing; and a second window that covers a main area of the flexible display corresponding to the first lower surface of the first housing and the second upper surface of the second housing. The first window may be made of a material harder than that of the second window. The sub-area and the main area may be driven independently.

Figure 4A:
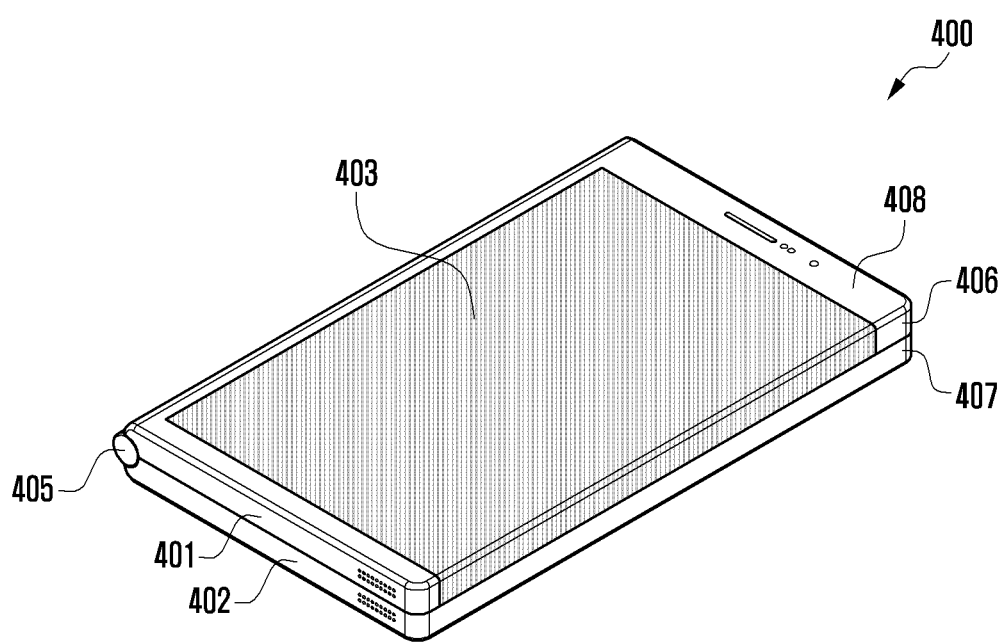
FIGS. 4A to 6C are diagrams illustrating a configuration example of an electronic device according to various embodiments of the present invention.
Figure 4B:
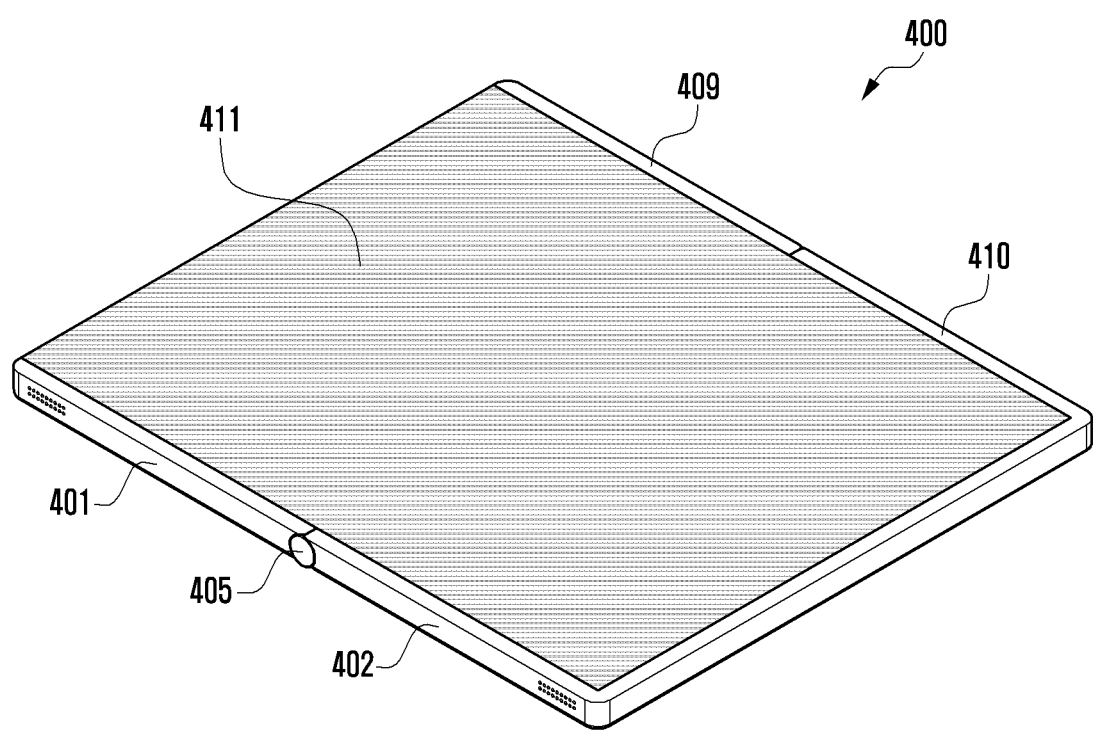
Figure 4C:
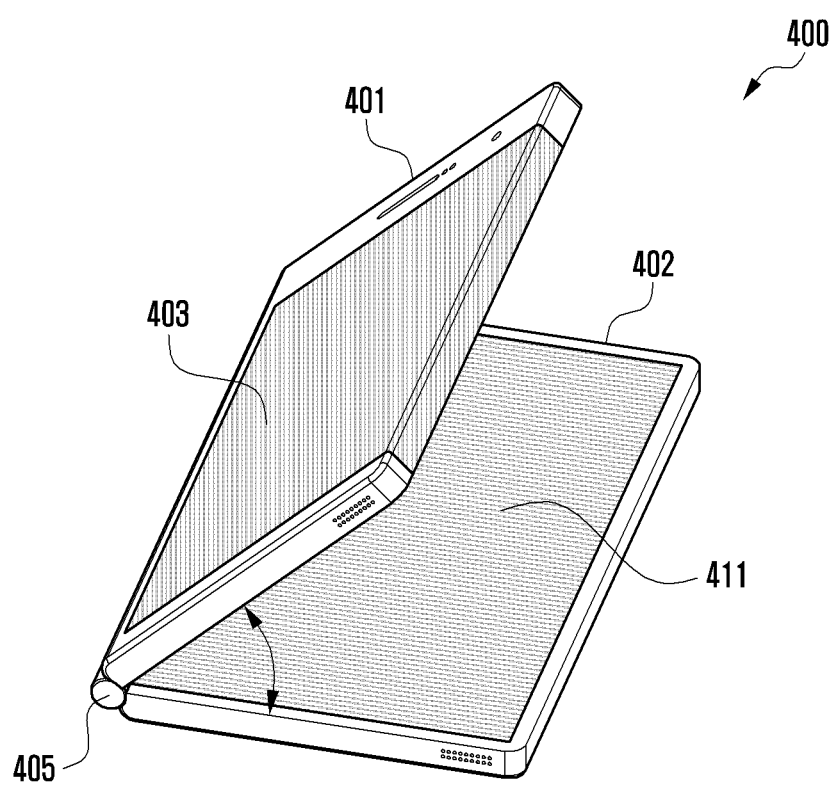

With reference to FIGS. 4A to 4C, an electronic device 400 may include a first housing 401 and a second housing 402. The first housing 401 and the second housing 402 are coupled by a connection member 405 to be connected rotatably. The connection member 405 may include a hinge. The first housing 401 may include a first upper surface 403, a first side surface 406, a second side surface (not shown), and a first lower surface 409. According to an embodiment, an angle formed by the first upper surface 403 and the first side surface 406 of the first housing 401 may be a right angle or an obtuse angle.

The second housing 402 may include a second upper surface 410, a third side surface (not shown), a fourth side surface 407, and a second lower surface (not shown). The second housing 402 may be connected rotatably relative to the first housing 401. In some embodiments, the electronic device may include a connection member 405 for rotatably connecting the first housing 401 and the second housing 402. In some embodiments, the connection member may be formed integrally with the first housing 401 or the second housing 402.

The electronic device may have a folded state in which the first lower surface 409 of the first housing 401 and the second upper surface 410 of the second housing 402 face about the connection member 405 or an unfolded state of the first housing 401 and the second housing 402 such that the first lower surface 409 of the first housing 401 and the second upper surface 410 of the second housing 402 are positioned on a single plane. In a state in which the electronic device is folded, a flexible display area corresponding to the first upper surface 403 and the first side surface 406 may be exposed to the outside. For example, in a state in which the electronic device is folded, a flexible display area corresponding to the first upper surface 403 may be activated. The activation may mean display of a screen corresponding to the display area. Alternatively, activation may mean display of a screen in a partial area of the display area. Alternatively, activation may mean supply of power to pixels corresponding to a display area to display a screen. Alternatively, activation may mean a change of the display from a sleep state to an active state. A first flexible display area corresponding to the first lower surface 409 and the second upper surface 410 may be deactivated. The deactivation may mean turning off of a screen corresponding to the display area. Alternatively, deactivation may mean non-supply of power to pixels corresponding to a display area for display of a screen. Alternatively, deactivation may mean a change of the display from an active state to a sleep state.

Further, in a state in which the electronic device is folded, the electronic device may deactivate a flexible display area corresponding to the first upper surface 403 and activate a flexible display area corresponding to the first side surface 406.

A second side surface (may be the opposite side of the first side surface) of the first housing 401 and a third side surface of the second housing 402 may be coupled by a rotatable connection member. For example, at the second side surface of the first housing 401, a hinge 405 may be formed. At the third side surface of the second housing 402, a hinge 405 may be formed. The hinge 405 formed at the second side surface of the first housing 401 may be connected rotatably to the hinge 405 formed at the third side surface of the second housing 402. For example, the first housing 401 and the second housing 402 may be folded or unfolded about the hinge 405. FIG. 4A illustrates a state in which the first housing 401 and the second housing 402 are folded. FIG. 4B illustrates a state in which the first housing 401 and the second housing 402 are unfolded. FIG. 4C illustrates a state in which the first housing 401 and the second housing 402 are unfolded at a predetermined angle.

At the first upper surface 403, the first side surface 406, the first lower surface 409 of the first housing 401, and the second upper surface 410 of the second housing 402, a single flexible display may be disposed. For example, the single flexible display may cover the first upper surface 403, the first side surface 406, the first lower surface 409 of the first housing 401, and the second upper surface 410 of the second housing 402. For example, the single flexible display may be extended from the first upper surface 403 to the first side surface 406 of the first housing 401 to cover the first lower surface 409 and the second upper surface 410 of the second housing 402. The single flexible display may be bent from the first side surface 406 of the first housing 401 to the outside to enclose the first housing 401, be bent to the inside in a portion of the hinge 405 to which the first housing 401 and the second housing 402 are coupled, and be extended to the second upper surface 410 of the second housing 402.

In some embodiments, in at least a partial area of the first upper surface 403, a keyboard may be mounted.

In some embodiments, at an outer side surface of the flexible display, a window may be disposed. The window may be made of plastic, glass, or a film of a transparent material and may protect the flexible display from an external impact. In some embodiments, a first window may be extended from the first upper surface 403 to the first side surface 406 and be made of a first material. In some embodiments, a second window may be extended from the first lower surface 409 of the first housing 401 to the second upper surface 410 of the second housing 402 and be made of a second material. The first material may be harder than the second material. For example, the first material of the first window may include plastic or glass, and the second material of the second window may include a film. At least a partial area of the second window corresponding to an area in which the second side surface and the third side surface are connected may be folded according to a rotation of the first housing 401 and the second housing 402. A plane of the first window may be positioned lower than that of the first housing.

In a state in which the first housing 401 and the second housing 402 are folded, a flexible display area corresponding to the first upper surface 403 and the first side surface 406 of the first housing 401 may be exposed to the outside. Alternatively, a first flexible display area corresponding to the first lower surface 409 of the first housing 401 and the second upper surface 410 of the second housing 402 may not be exposed to the outside. A flexible display area corresponding to the first side surface 406 may be fixed in a form bent to the outside to be mounted to the first side surface 406. A flexible display area corresponding to the second side surface and the third side surface may be folded to the inside to be mounted in the first lower surface 409 and the second upper surface 410.

In the following description, for convenience of description, a flexible display area corresponding to the first upper surface 403 of the first housing 401 may be referred to as a first area, a flexible display area corresponding to the first side surface 406 of the first housing 401 may be referred to as a second area, a flexible display area corresponding to the first lower surface 409 of the first housing 401 may be referred to as a third area, and a flexible display area corresponding to the second upper surface 410 of the second housing 402 may be referred to as a fourth area. Further, an area in which the flexible display area is folded according to folding of the first housing 401 and the second housing 402 may be referred to as a hinge area of the flexible display.

The first window that covers the first area and the second area of the flexible display exposed to the outside when the first housing 401 and the second housing 402 are folded may be different from the second window corresponding to the third area and the fourth area of the flexible display that is not exposed to the outside. For example, a material of the first window may be different from that of the second window. In a state in which the first housing 401 and the second housing 402 are folded, because the first window is exposed to the outside, the first window may be relatively harder than the second window. In a state in which the first housing 401 and the second housing 402 are folded, because the second window is not exposed to the outside and should cover the hinge 405, a material of the second window may be relatively softer than that of the first window. For example, the first window may be made of plastic or glass. The second window may be made of a film.

According to an embodiment, the window that covers the first area, the second area, the third area, and the fourth area may be made of plastic or glass, and only the window that covers the hinge area may be made of a film.

In some embodiments, there is no bezel in the first side area 406 of the first housing 401, and the second area of the flexible display may operate as an edge display.

According to an embodiment, the flexible display mounted in the first upper surface of the first housing 401 may be disposed in a partial area of the first upper surface or an entire first upper surface. Hereinafter, a mounting form of the flexible display will be described with reference to FIGS. 4D to 4F.

Figure 4D:
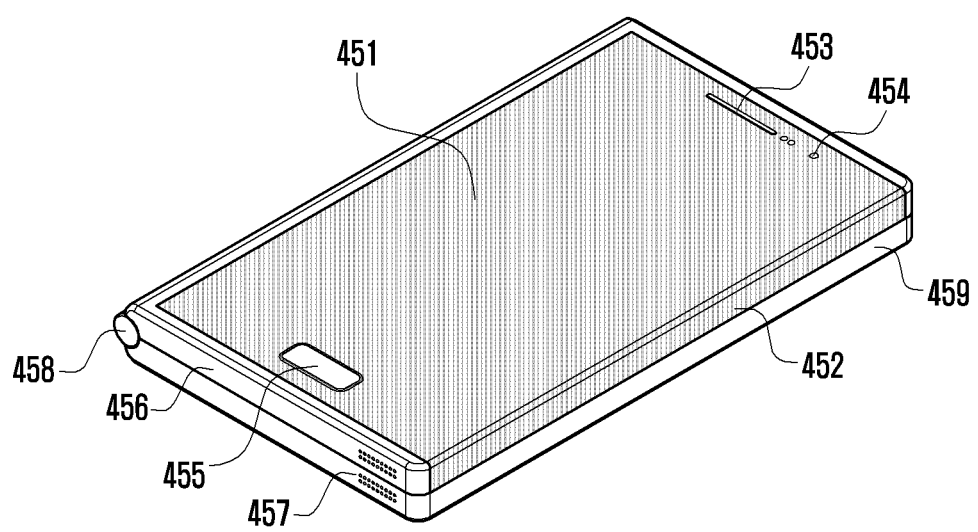

FIG. 4D illustrates a first housing 456, a second housing 457, and a hinge 458. The first housing 456 and the second housing 457 may be connected rotatably coupled by the hinge 458. The first upper surface of the first housing 456 may include a home button 455, a speaker 453, a sensor 454, and a flexible display 451. The flexible display 451 may be mounted to cover the first upper surface and a first side surface 452 of the first housing 456. The flexible display 451 may be mounted to cover the entire first upper surface of the first housing 456; and, in the flexible display 451, in order to expose the home button 455, the speaker 453, and the sensor 454 to the outside, a hole may be formed in a corresponding area.

Figure 4E:
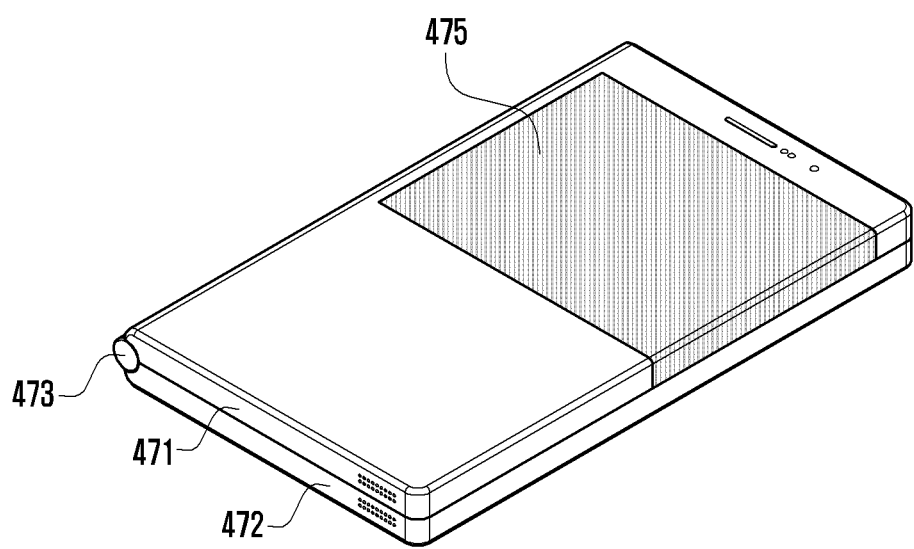

FIG. 4E illustrates a first housing 471, a second housing 472, and a hinge 473. The first housing 471 and the second housing 472 may be connected rotatably by the hinge 473. A flexible display 475 may be mounted in an upper end area of the first upper surface of the first housing 471 and be extended to the first side area of the first housing 471.

Figure 4F:
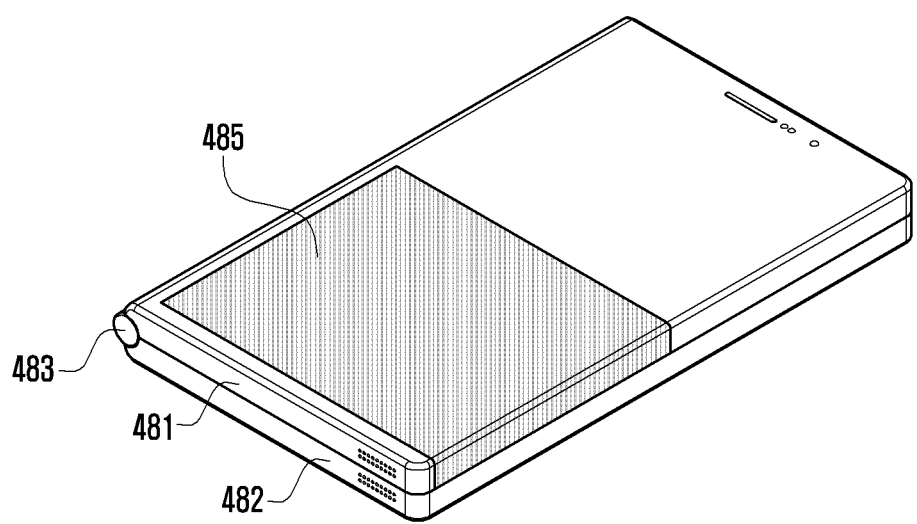

FIG. 4F illustrates a first housing 481, a second housing 482, and a hinge 483. The first housing 481 and the second housing 482 may be connected rotatably by the hinge 483. A flexible display 485 may be mounted in a lower end area of the first upper surface of the first housing 481 and be extended to a first side area of the first housing 481.

Figure 5A:
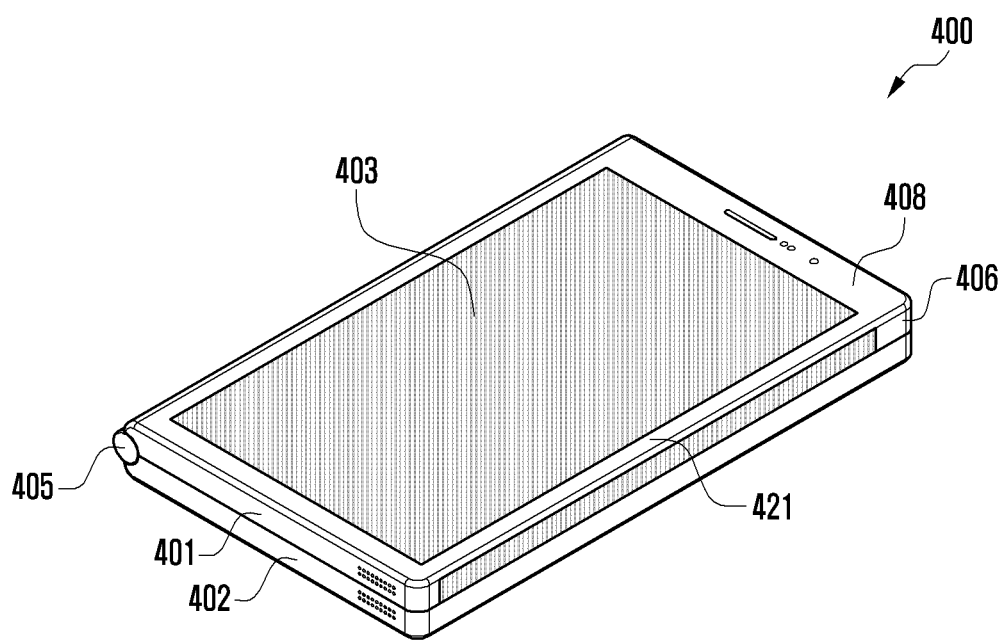
Figure 5B:
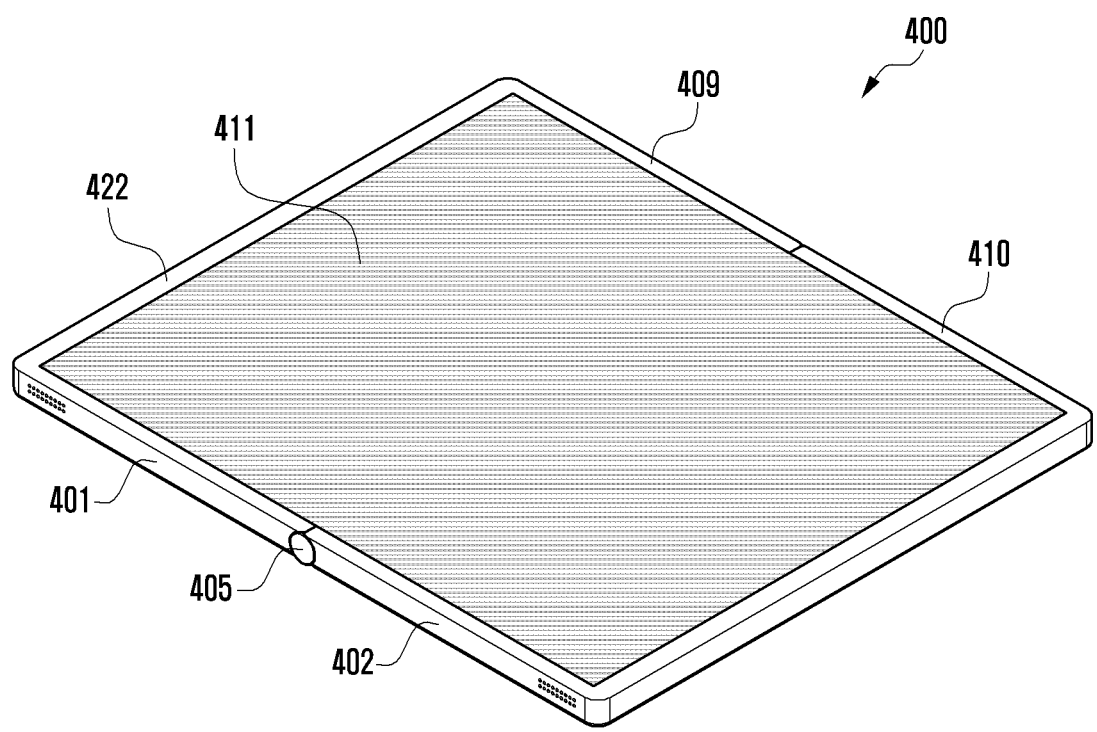
Figure 5C:
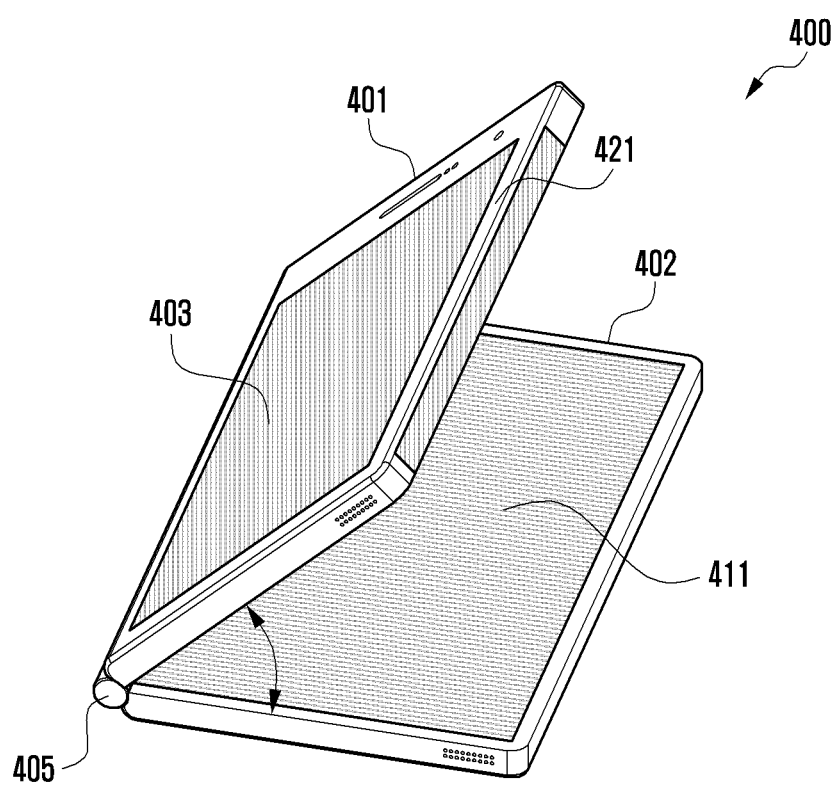

FIG. 5A illustrates a state in which a first housing 401 and a second housing 402 are folded. FIG. 5B illustrates a state in which a first housing 401 and a second housing 402 are unfolded. FIG. 5C illustrates a state in which a first housing 401 and a second housing 402 are unfolded in a predetermined angle.

With reference to FIGS. 5A to 5C, the electronic device may include a first housing 401 and a second housing 402. A first area and a second area of the flexible display may be divided by a bezel portion 421 of the first housing 401. At a first side surface 406 of the first housing 401, a second area of the flexible display may be exposed; and at the outside of the second area, the bezel portion 421 may be formed. A first lower surface 409 of the first housing 401 may include a bezel portion 422. The following description is the same as that of FIGS. 4A to 4C; therefore, a detailed description thereof will be omitted.

Figure 6A:
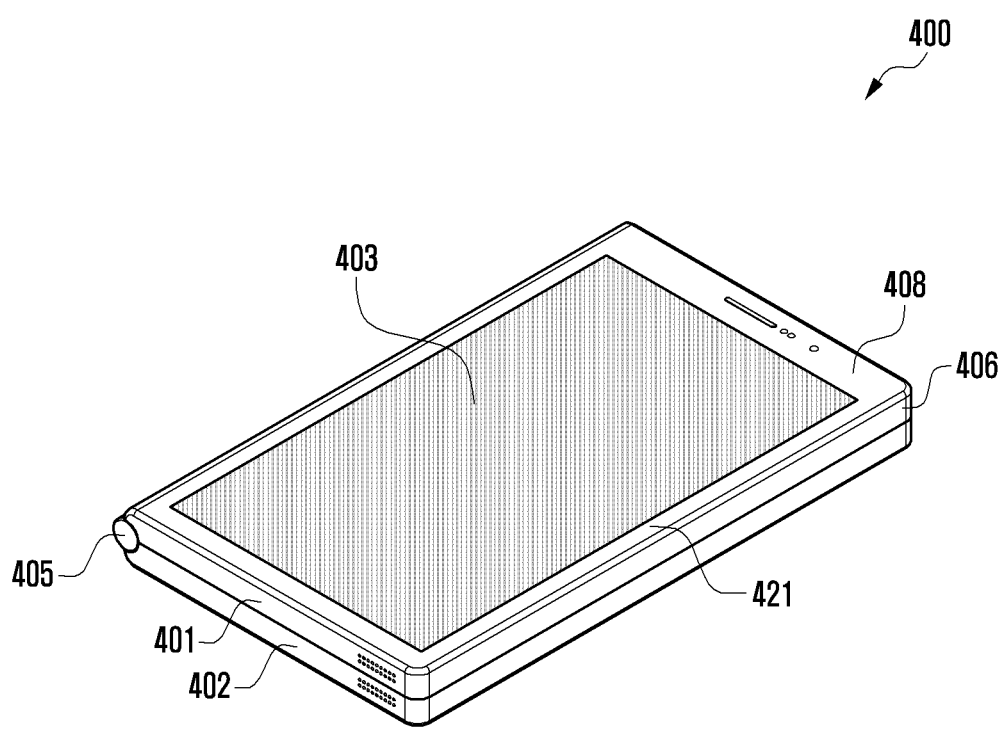
Figure 6B:
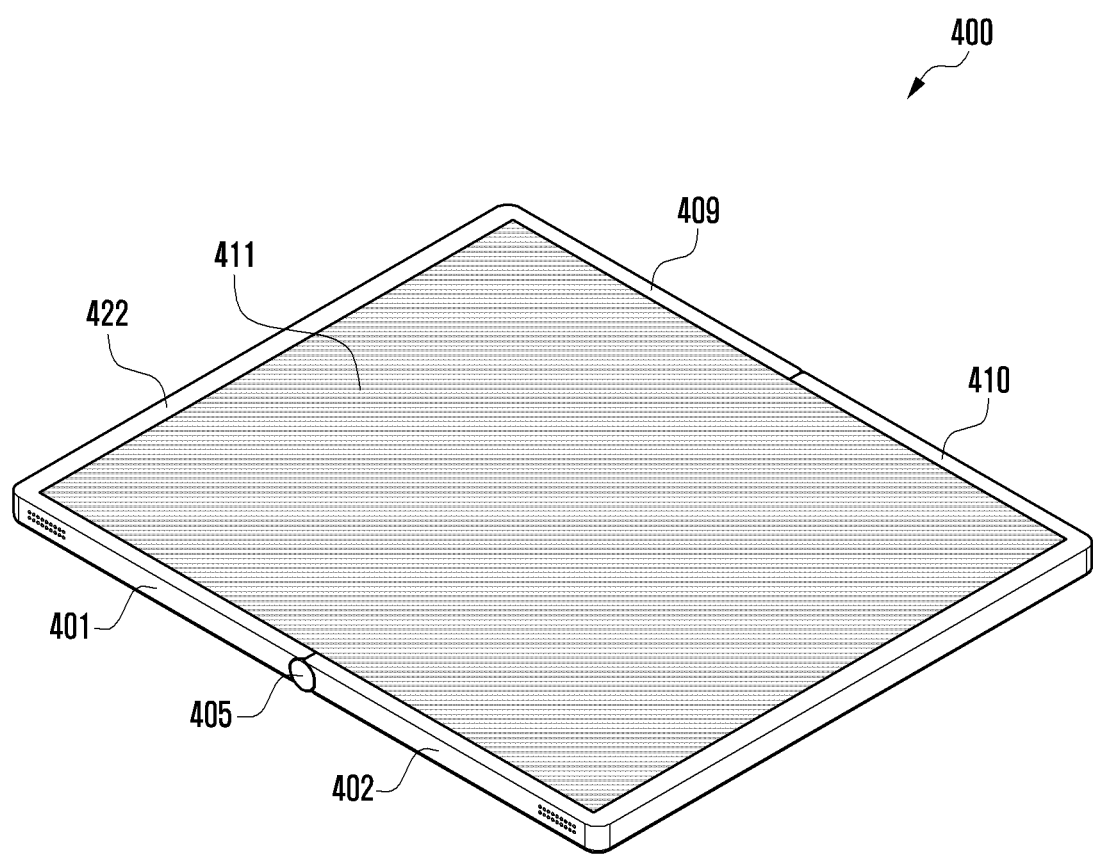
Figure 6C:
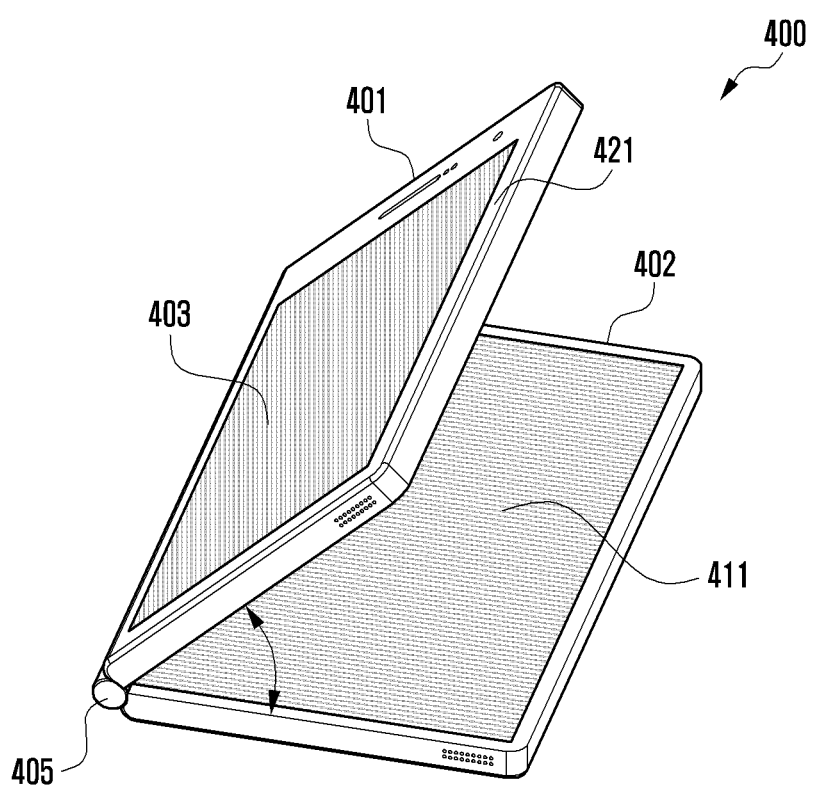

FIG. 6A illustrates a state in which a first housing 401 and a second housing 402 are folded. FIG. 6B illustrates a state in which a first housing 401 and a second housing 402 are unfolded. FIG. 6C illustrates a state in which a first housing 401 and a second housing 402 are unfolded in a predetermined angle.

With reference to FIGS. 6A to 6C, the electronic device may include a first housing 401 and a second housing 402. A first area and a second area of the flexible display may be divided by a bezel portion 421 of the first housing 401. At a first side surface 406 of the first housing 401, a second area of the flexible display may be exposed; and at the outside of the second area, a bezel portion may be formed. A first lower surface 409 of the first housing 401 may include a bezel portion 422. The second area of the flexible display corresponding to the first side surface 406 of the first housing 401 may be a dummy display area. A material of the dummy display is the same as that of the flexible display, but the dummy display may not perform a display function.

According to an embodiment, there is no bezel portion between a first upper surface 403 and the first side surface of the first housing 401, and the first side surface 406 may be a dummy display area. The following description is the same as that of FIGS. 4A to 4C; therefore, a detailed description thereof will be omitted.

Figure 7A:
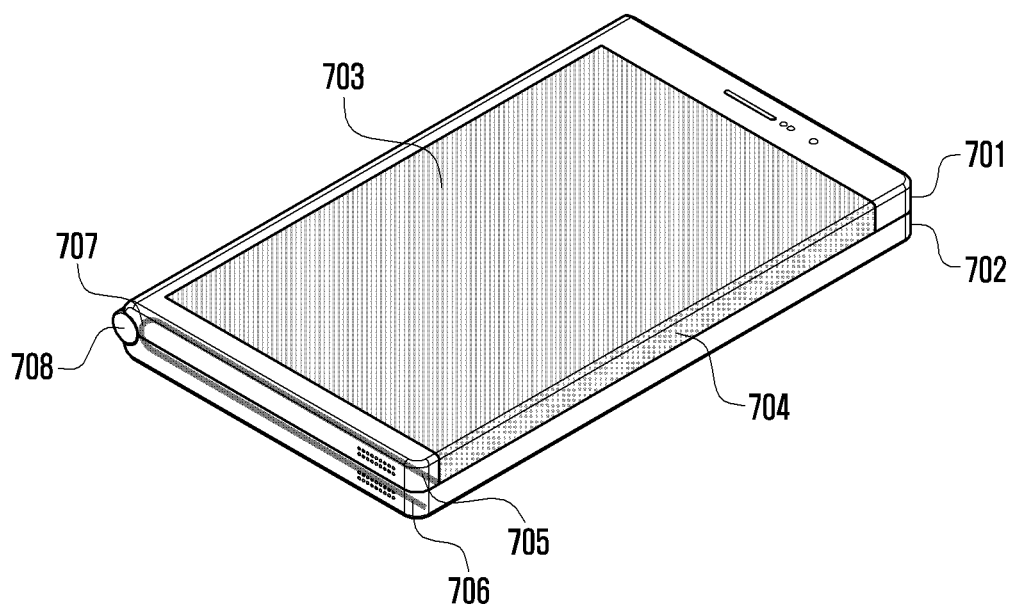
FIGS. 7A and 7C are diagrams illustrating a state in which a flexible display is mounted in an electronic device according to various embodiments of the present invention.
Figure 7B:
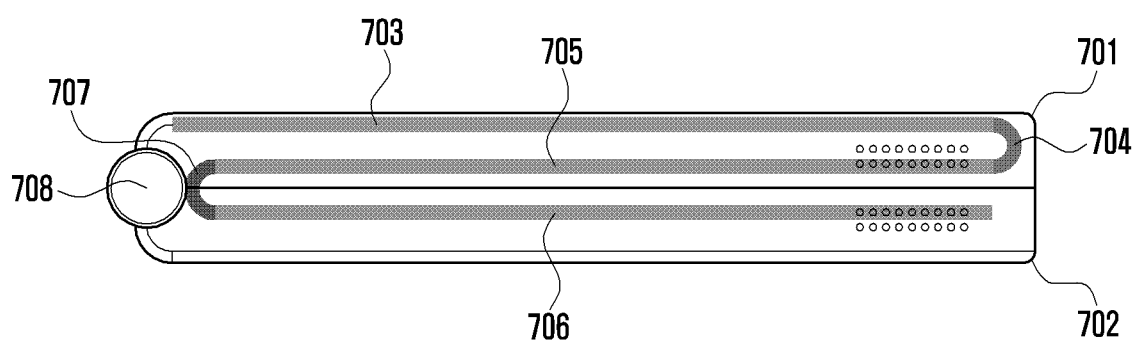
Figure 7C:
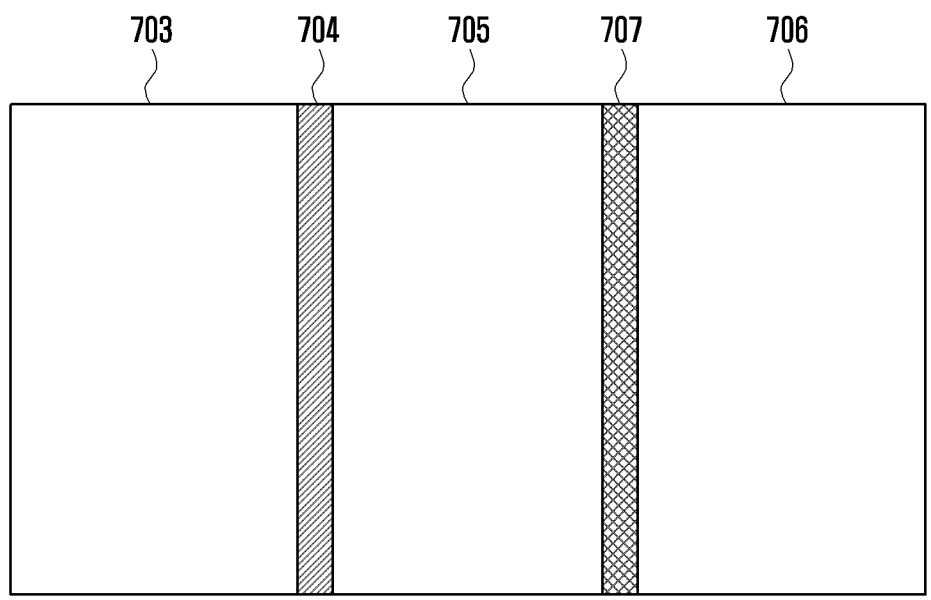

FIGS. 7A and 7C are diagrams illustrating a state in which a flexible display is mounted in an electronic device.

FIG. 7A illustrates a state in which an electronic device is folded. A first housing 701 and a second housing 702 are rotatably connected by a hinge 708.

The flexible display may cover an upper surface, a side surface 704, and a lower surface of the first housing 701 and an upper surface of the second housing 702. The flexible display may be bent to the outside at the side surface 704 of the first housing 701 to enclose the side surface of the first housing 701. The flexible display may be folded to the inside in a portion 707 in which the first housing 701 and the second housing 702 are connected. When the first housing 701 and the second housing 702 rotate, the flexible display may be in a folded state or an unfolded state. In a state in which the first housing 701 and the second housing 702 are folded, information may be displayed in a side display area 704 and/or a flexible display area 703 that covers the upper surface of the first housing 701. According to an embodiment, in a flexible display area 705 that covers the lower surface of the first housing 701 and a flexible display area 706 that covers the upper surface of the second housing 702, a screen may be turned off.

FIG. 7B illustrates a cross-section of an electronic device. A first area 703 of the flexible display may be mounted at an upper surface of the first housing 701, a second area 704 thereof may be mounted at the side surface of the first housing 701, a third area thereof may be mounted at the lower surface of the first housing 701, and a fourth area thereof may be mounted at the upper surface of the second housing 702. The second area may be bent to the outside to form a curved surface. The third area and the fourth area may be bent to the inside and form a hinge area 707. The third area and the fourth area of the flexible display may face each other in a folded state.

At a front surface of the flexible display, a transparent window for protecting the flexible display from an external impact may be mounted. A window material may be different according to an area of the flexible display. For example, the window mounted in a first area and a second area of the flexible display exposed to the outside in a state in which the electronic device is folded may be made of a hard material. The third area, the hinge area, and the fourth area of the flexible display may not be exposed to the outside in a state in which the electronic device is folded and may maintain a folded state and an unfolded state, and be made of a soft material. In particular, because the hinge area 707 should repeat a bending state and an unbending state, the window of a hard material may not be used. Therefore, a first window mounted in the first area and the second area of the flexible display may be made of plastic or glass. A second window mounted in the third area, the hinge area 707, and the fourth area of the flexible display may be made of a film. According to an embodiment, the second window mounted in the third area and the fourth area of the flexible display may be made of plastic or glass, and the hinge area may be made of a film.

In some embodiments, the first window may be made of a film.

A hinge 708 may be formed in a portion of the first housing 701 and/or a portion of the second housing 702. The electronic device may maintain a folding state and an unfolding state by the hinge 708.

FIG. 7C illustrates an unfolded state of the flexible display. FIG. 7C illustrates a first area 703, a second area 704, a third area 705, a hinge area 707, and a fourth area 706 of the flexible display. The first area, the second area, and the third area may be bent to the outside; and the third area, the hinge area, and the fourth area may be bent to the inside.

Figure 8A:
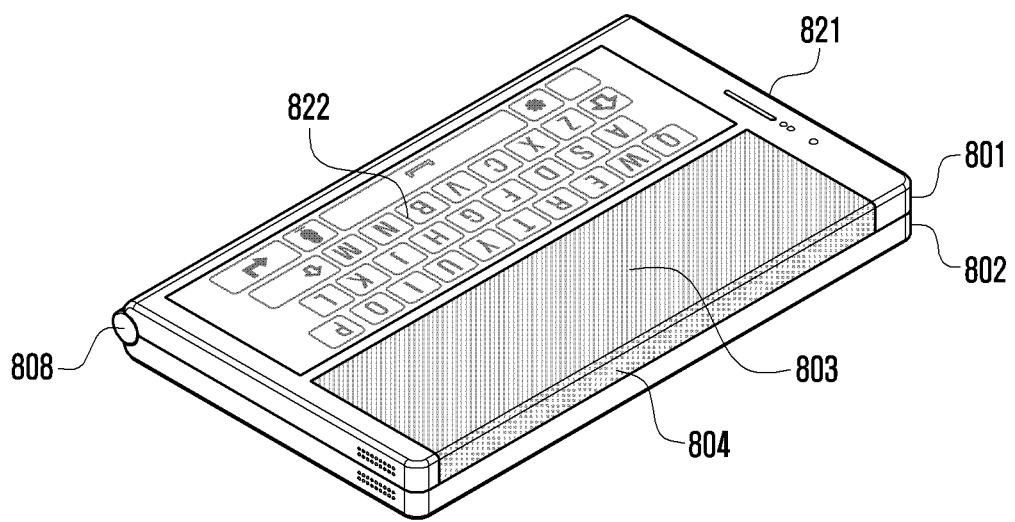
FIGS. 8A to 8C are diagrams illustrating another example in which a flexible display is mounted in an electronic device according to various embodiments of the present invention.
Figure 8B:
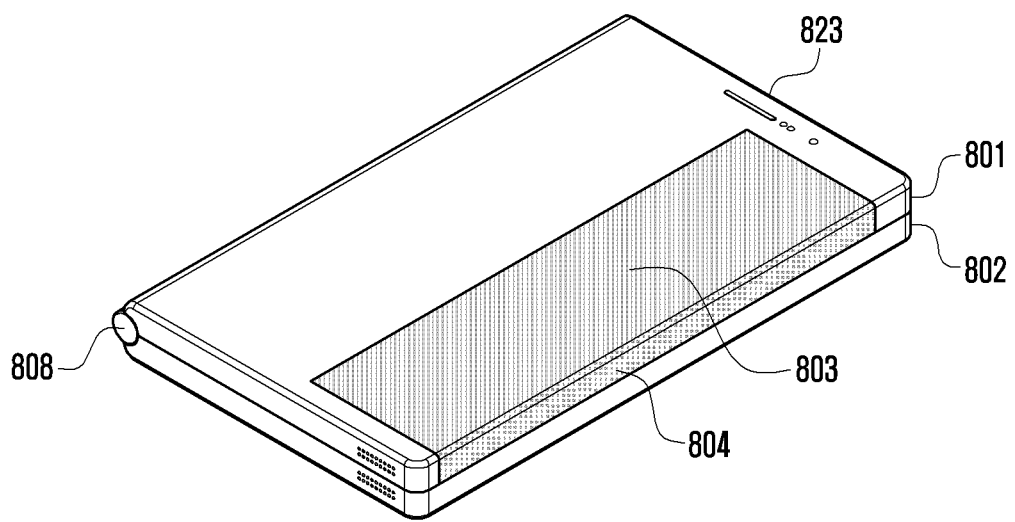
Figure 8C:
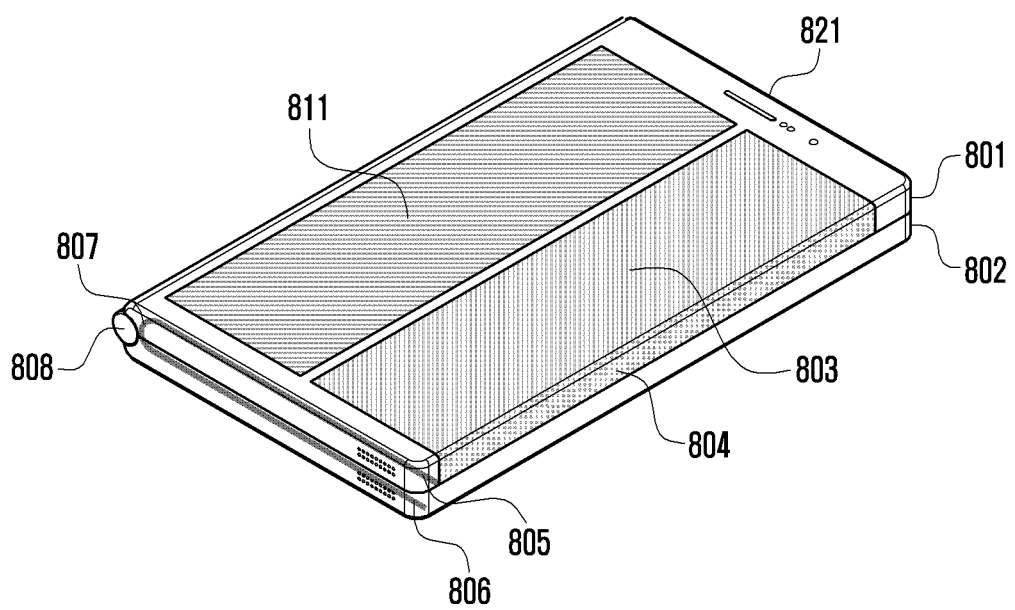

FIGS. 8A to 8C are diagrams illustrating another example in which a flexible display is mounted in an electronic device according to various embodiments of the present invention.

With reference to FIG. 8A, in a partial area 821 of an upper surface of a first housing 801 of the electronic device, a flexible display 803 may be disposed, and in other areas of an upper surface 821 of the first housing 801, a keyboard 822 may be disposed. The user may enter a character (may include numbers, symbols, etc.) using a keyboard, and the input character may be displayed in the flexible display 803.

According to an embodiment, as the keyboard 822, cholesteric liquid crystal (CLC: reflective low power display), E-paper, a transparent display, or a physical keyboard may be used.

With reference to FIG. 8B, the electronic device 101 may dispose the flexible display 803 in a partial area of an upper surface 823 of the first housing 801 thereof.

FIG. 8C illustrates a state in which the electronic device 101 is folded. A first housing 801 and a second housing 802 are rotatably connected by a hinge 808.

The flexible display may cover an upper surface 821, a side surface 804, a lower surface of the first housing 801, and an upper surface of the second housing 802. In a partial area of the upper surface 821 of the first housing 801, a flexible display 803 may be disposed; and in other areas of the upper surface 821 of the first housing 801, a keyboard 811 may be disposed. The user may enter a character (may include numbers, symbols, etc.) using a keyboard, and the input character may be displayed in the flexible display 803.

According to an embodiment, as the keyboard 811, CLC (reflective low power display), E-paper, a transparent display, or a physical keyboard may be used.

The flexible display is bent to the outside at the side surface 804 of the first housing 801 to enclose the side surface 804 of the first housing 801. The flexible display may be folded to the inside in a portion 807 in which the first housing 801 and the second housing 802 are connected. When the first housing 801 and the second housing 802 rotate, the flexible display may be in a folded state or an unfolded state. In a state in which the first housing 801 and the second housing 802 are folded, information may be displayed in a side display area 804 and a flexible display area 803 that cover a portion of the upper surface 821 of the first housing 801. In this case, in a flexible display area 805 that covers a lower surface of the first housing 801 and a flexible display area 806 that covers an upper surface of the second housing 802, a screen may be turned off.

Figure 8D:
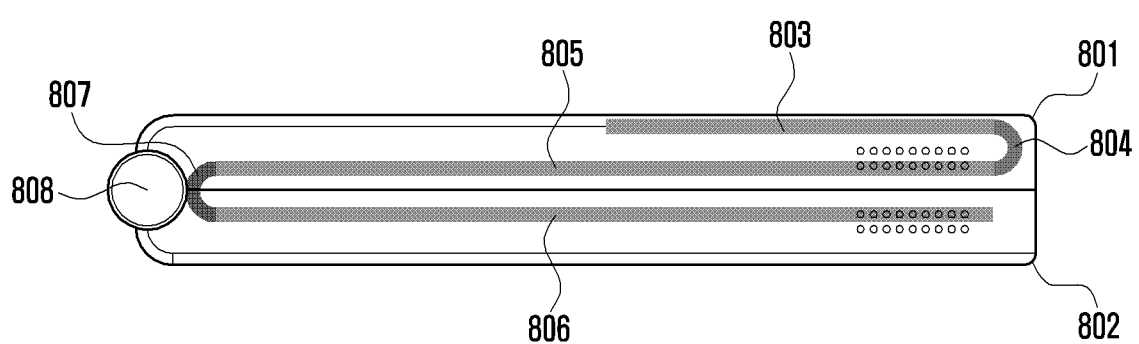

FIG. 8D illustrates a cross-section of an electronic device. A first area 803 of the flexible display may be mounted in a portion of the upper surface of a first housing 801, a second area 804 thereof may be mounted at a side surface of the first housing 801, a third area thereof may be mounted at a lower surface 805 of the first housing 801, and a fourth area thereof may be mounted at an upper surface 806 of a second housing 802. The second area may form a curved surface while being bent to the outside. The third area and the fourth area may be bent to the inside to form a hinge area 807. The third area and the fourth area of the flexible display may face each other in a folded state.

At a front surface of the flexible display, a transparent window for protecting the flexible display from an external impact may be mounted. A window material may be different according to an area of the flexible display. For example, a window mounted in a first area and a second area of the flexible display exposed to the outside in a state in which the electronic device is folded may be made of a hard material. A third area, a hinge area, and a fourth area of the flexible display may not be exposed to the outside in a state in which the electronic device is folded and may maintain a folded state and an unfolded state, and be made of a soft material. The hinge area may be made of a soft material that may repeat a bending state and an unbending state. Therefore, a first window attached to the first area and the second area of the flexible display may be made of plastic or glass. A second window mounted in the third area, the hinge area, and the fourth area of the flexible display may be made of a film. In some embodiments, a film may be used in the first window.

A hinge 808 may be formed in a portion of the first housing 801 and/or a portion of the second housing 802. The electronic device may maintain an unfolded state and a folded state by the hinge 808.

Figure 8E:
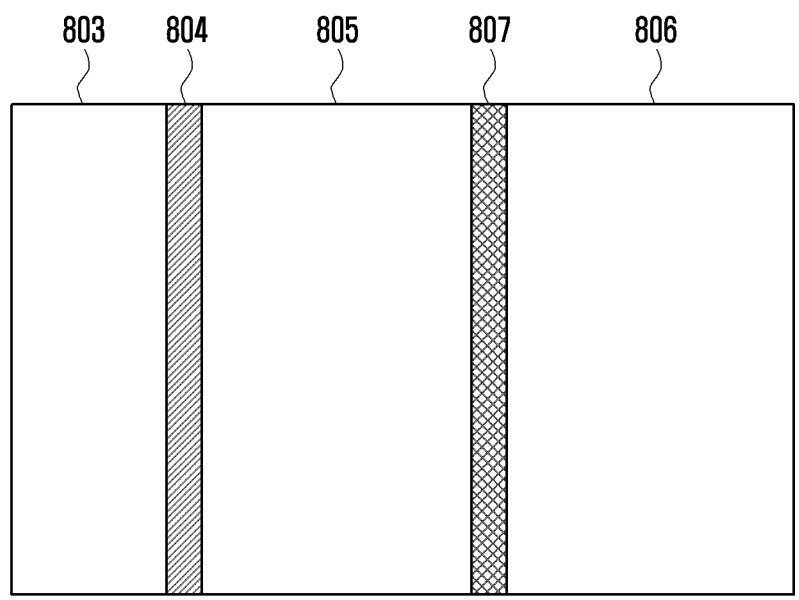

FIG. 8E illustrates an unfolded state of the flexible display. FIG. 8E illustrates a first area 803, second area 804, third area 805, hinge area 807, and fourth area 806 of the flexible display. The first area 803, the second area 804, and the third area 805 may be bent to the outside; and the third area 803, the hinge area 807, and the fourth area 806 may be bent to the inside.

FIGS. 9A to 9E are diagrams illustrating another example in which a flexible display is mounted in an electronic device according to various embodiments of the present invention.

Figure 9A:
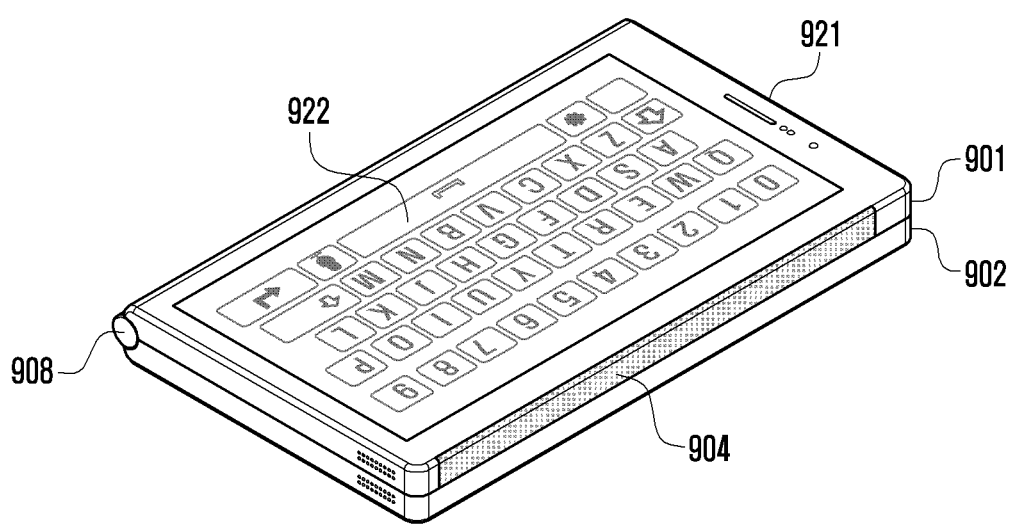
FIGS. 9A to 9E are diagrams illustrating another example in which a flexible display is mounted in an electronic device according to various embodiments of the present invention.

With reference to FIG. 9A, a flexible display may be mounted at a side surface 904 of a first housing 901; and at an upper surface 921 of the first housing 901, a physical keyboard 922 may be mounted.

Figure 9B:
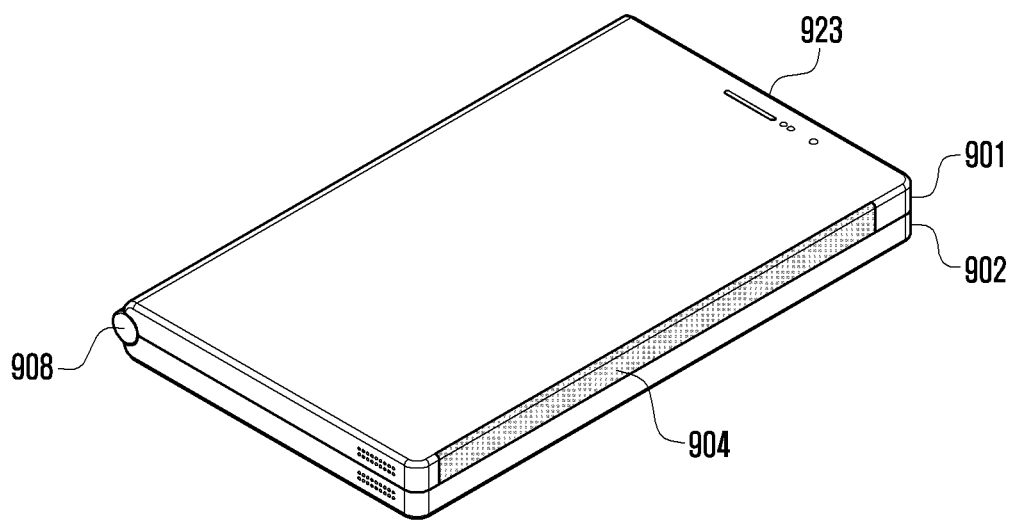

With reference to FIG. 9B, a flexible display may be mounted at the side surface 904 of the first housing 901. At an upper surface 923 of a first housing 901, a flexible display may not be mounted.

Figure 9C:
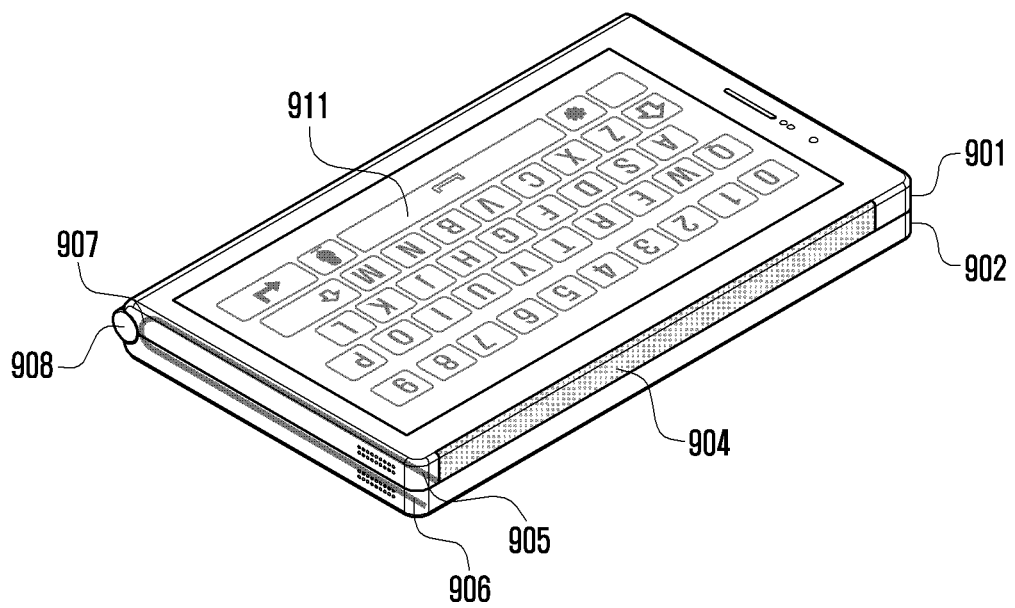

FIG. 9C illustrates a state in which an electronic device is folded. A first housing 901 and a second housing 902 may be rotatably connected by a hinge 908.

A flexible display may cover a first side surface 904, a lower surface of the first housing 901, and an upper surface of the second housing 902. The flexible display may be bent to the outside at the side surface portion 904 of the first housing 901 to enclose the side surface of the first housing 901. The flexible display may be folded to the inside in a portion 907 in which the first housing 901 and the second housing 902 are connected. When the first housing 901 and the second housing 902 rotate, the flexible display may be in a folded state or an unfolded state. In a state in which the first housing 901 and the second housing 902 are folded, information may be displayed in a flexible display area 904 corresponding to the side surface of the first housing 901. According to an embodiment, in a flexible display area 905 that covers a lower surface of the first housing 901 and a flexible display area 906 that covers the upper surface of the second housing 902, a screen may be turned off.

Figure 9D:
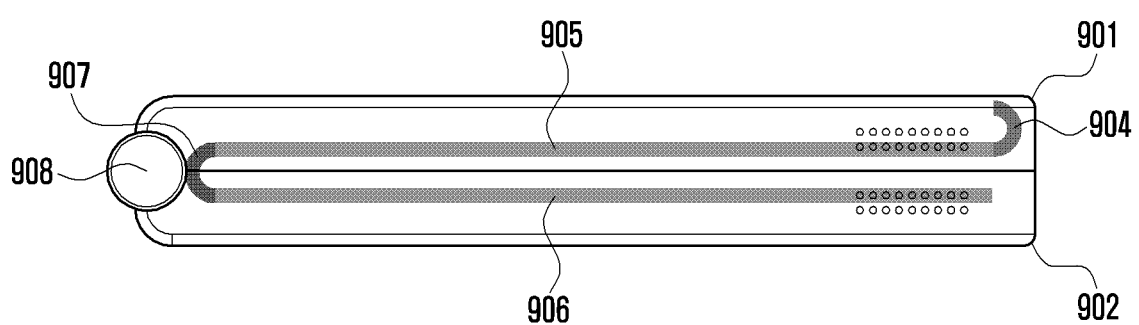

FIG. 9D illustrates a cross-section of an electronic device. The flexible display may be extended to and mounted at a side surface 904 and a lower surface 905 of the first housing 901 and an upper surface 906 of the second housing 902. A flexible display area that covers an area of the side surface 904 of the first housing 901 may form a curved surface while being bent to the outside. A flexible display area that covers the lower surface 905 of the first housing 901 and the upper surface 906 of the second housing 902 may form a hinge area 907 while being folded to the inside. A flexible display area that covers the lower surface 905 of the first housing 901 and the upper surface 906 of the second housing 902 may face each other in a folded state.

At a front surface of the flexible display, a transparent window for protecting the flexible display from an external impact may be mounted. A window material may be different according to an area of the flexible display. For example, a window mounted in the flexible display area that covers the side surface 904 of the first housing 901 exposed to the outside in a state in which the electronic device is folded may be made of a hard material. A window mounted at the front surface of the flexible display area that covers the lower surface 905 of the first housing 901 and the upper surface 906 of the housing 902 may not be exposed to the outside in a state in which the electronic device is folded and may maintain a folded state and an unfolded state, and be made of a soft material. Because the hinge area 907 should repeat an unfolded state and a folded state, a window of a hard material may not be used. For example, a first window attached to a side area of the first housing 901 may be made of plastic or glass. A second window mounted at the lower surface 905 and the hinge area 907 of the first housing 901 and the upper surface 906 of the second housing 902 may be made of a film. In some embodiments, the first window may be made of a film.

A hinge 908 may be formed in a portion of the first housing 901 and/or a portion of the second housing 902. The electronic device may maintain a folding state and an unfolding state by the hinge 908.

Figure 9E:
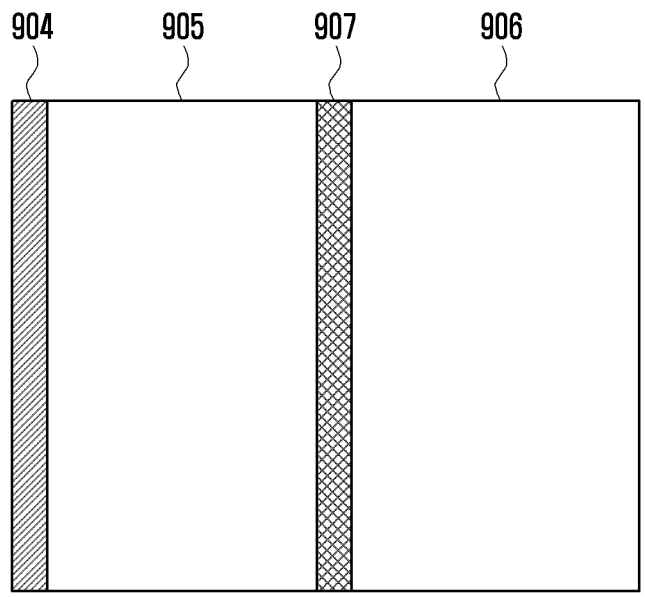

FIG. 9E illustrates an unfolded state of the flexible display. FIG. 9E illustrates a first area 904, second area 905, hinge area 907, and third area 906 of the flexible display. The first area 904 may be bent to the outside, and the second area 905, the hinge area 907, and the third area 906 may be folded to the inside.

FIGS. 10A to 10E are diagrams illustrating an example of mounting a first window and a second window at a front surface of a flexible display in an electronic device according to various embodiments of the present invention.

Figure 10A:
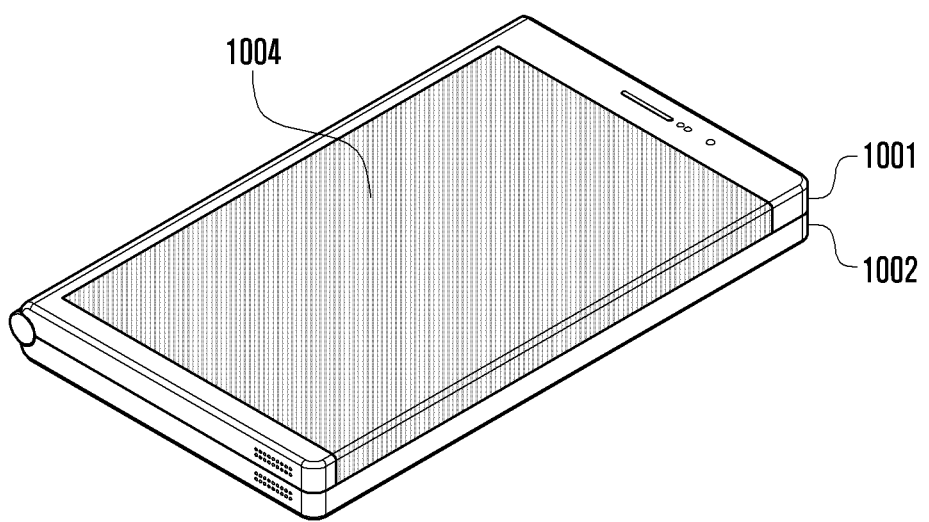
FIGS. 10A to 10E are diagrams illustrating an example of mounting a first window and a second window at a front surface of a flexible display in an electronic device according to various embodiments of the present invention.

FIG. 10A illustrates a state in which the electronic device is folded. A flexible display 1004 may cover an upper surface, a side surface, and a lower surface of a first housing 1001, and an upper surface of a second housing 1002. At a front surface of the flexible display area that covers the upper surface and the side surface of the first housing 1001, a first window may be mounted. At a front surface of the flexible display area that covers the lower surface of the first housing 1001 and the upper surface of the second housing 1002, a second window may be mounted. A material of the first window may be different from that of the second window. For example, a material of the first window may be plastic or glass. A material of the second window may be a film.

Figure 10B:
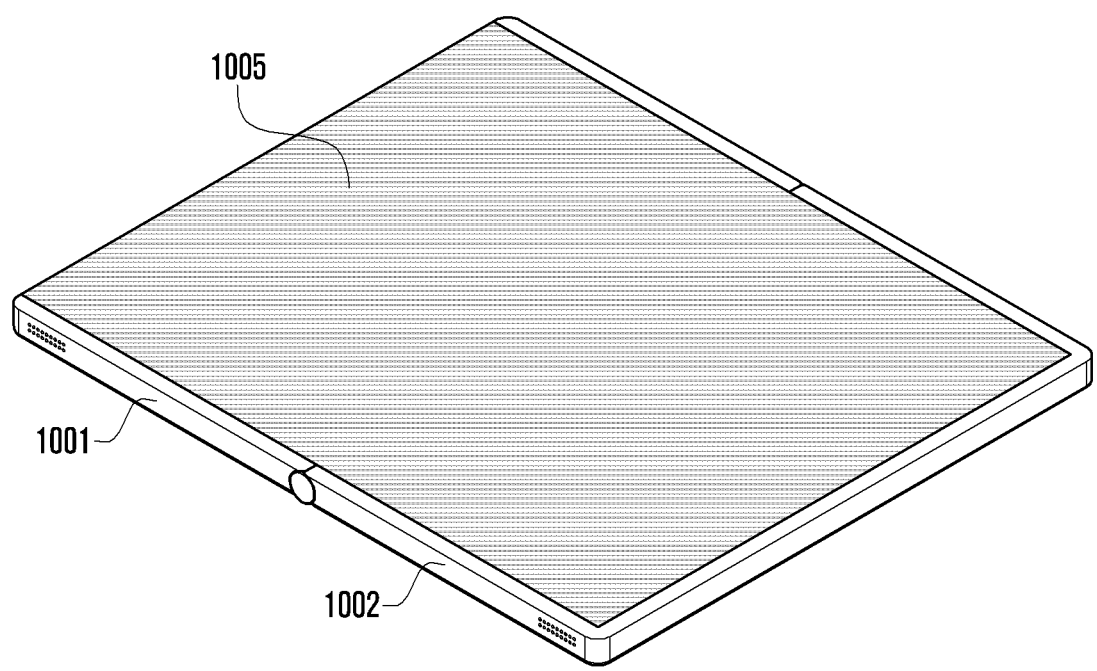

FIG. 10B illustrates a state in which the electronic device is unfolded. A flexible display 1005 may cover a lower surface of a first housing 1001 and an upper surface of a second housing 1002; and, at a front surface of the flexible display 1005, a second window may be mounted. A material of the second window may be a film.

Because a material of the first window is different from that of the second window, visibility may be deteriorated at an interface of the first window and the second window; thus, a printed matter and/or a black matrix may be inserted at an interface of the first window and the second window.

Figure 10C:
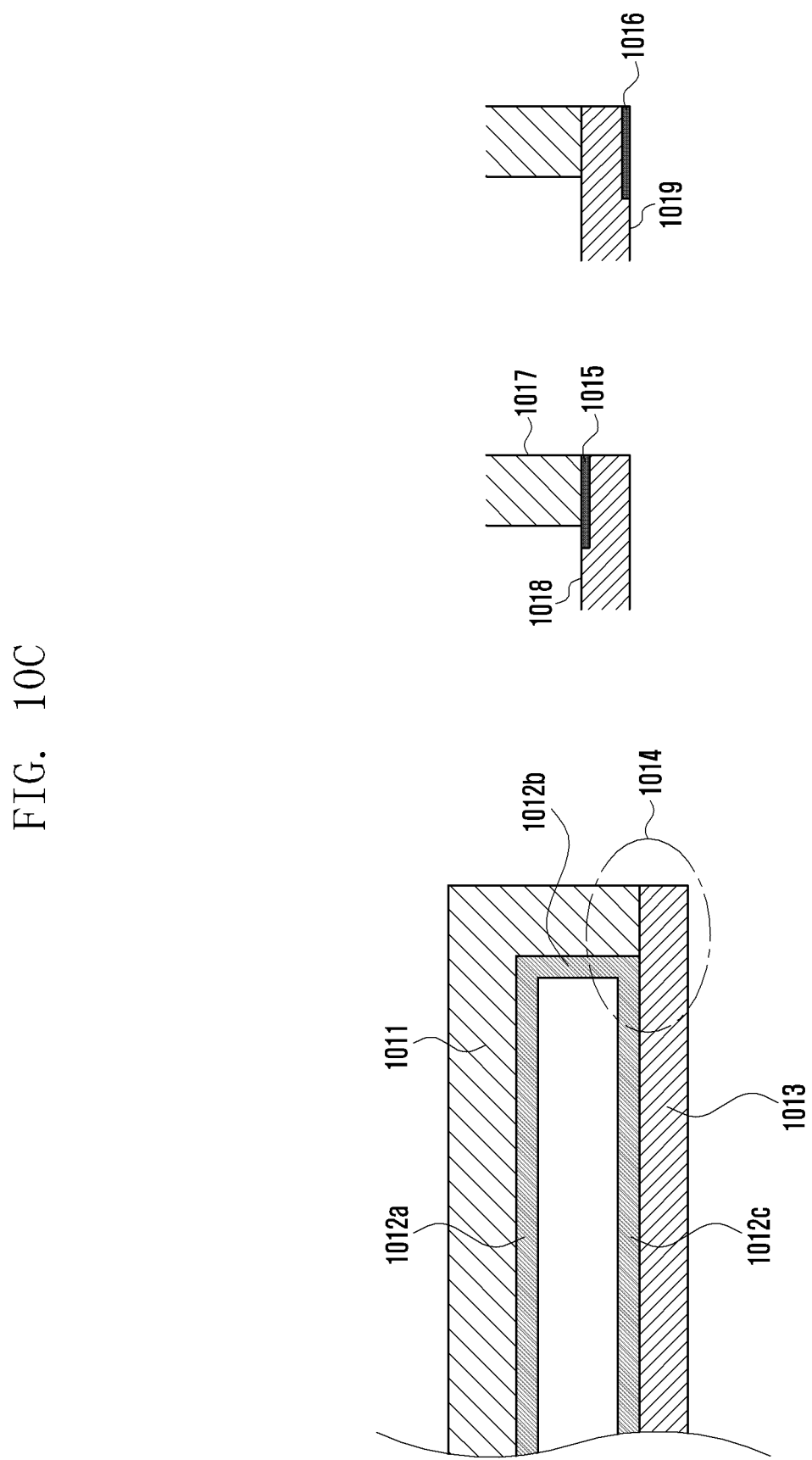

With reference to FIG. 10C, at a front surface of flexible display areas 1012a and 1012b that cover an upper surface and a side surface of the first housing 1001, a first window 1011 may be mounted; and, at a front surface of a flexible display area 1012c that covers a lower surface of the first housing 1001 and an upper surface of the second housing 1002, a second window 1013 may be mounted. For example, a first window may be attached to a flexible display area corresponding to the upper surface and the side surface of the first housing 1001, and a second window may be extended and attached to an end surface 1014 of the first window and a flexible display area corresponding to the lower surface of the first housing 1001. A printed matter and/or a black matrix 1015 may be inserted into a boundary of the first window and the second window. A printed matter and/or a black matrix may be inserted between a boundary end surface 1017 of the first window and an inner surface 1018 of the second window. Alternatively, a printed matter and/or a black matrix 1016 may be inserted into an outer surface 1019 of the second window.

Figure 10D:
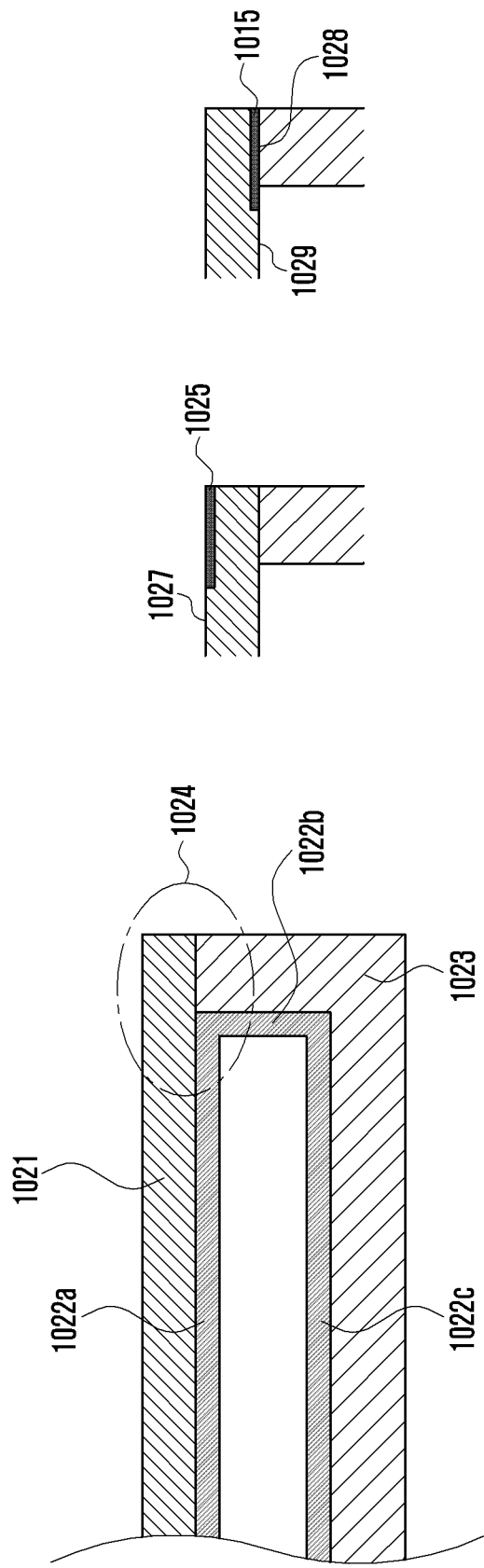

With reference to FIG. 10D, at a front surface of a flexible display area 1022a that covers the upper surface of the first housing 1001, a first window 1021 may be mounted; and, at a front surface of flexible display areas 1022b and 1022c that cover a lower surface of the first housing 1001 and an upper surface of the second housing 1002, a second window 1023 may be mounted. For example, the first window may be attached to the flexible display area 1022a corresponding to the upper surface of the first housing 1001, and the second window 1023 may be extended and attached to the flexible display areas 1022b and 1022c corresponding to the side surface and the lower surface of the first housing 1001 and an inner surface 1024 of the first window. A printed matter and/or a black matrix 1025 may be inserted into an outer surface 1027 of the first window. Alternatively, a printed matter and/or a black matrix 1015 may be inserted into an inner surface 1029 of the first window and a boundary end surface 1028 of the second window.

Figure 10E:
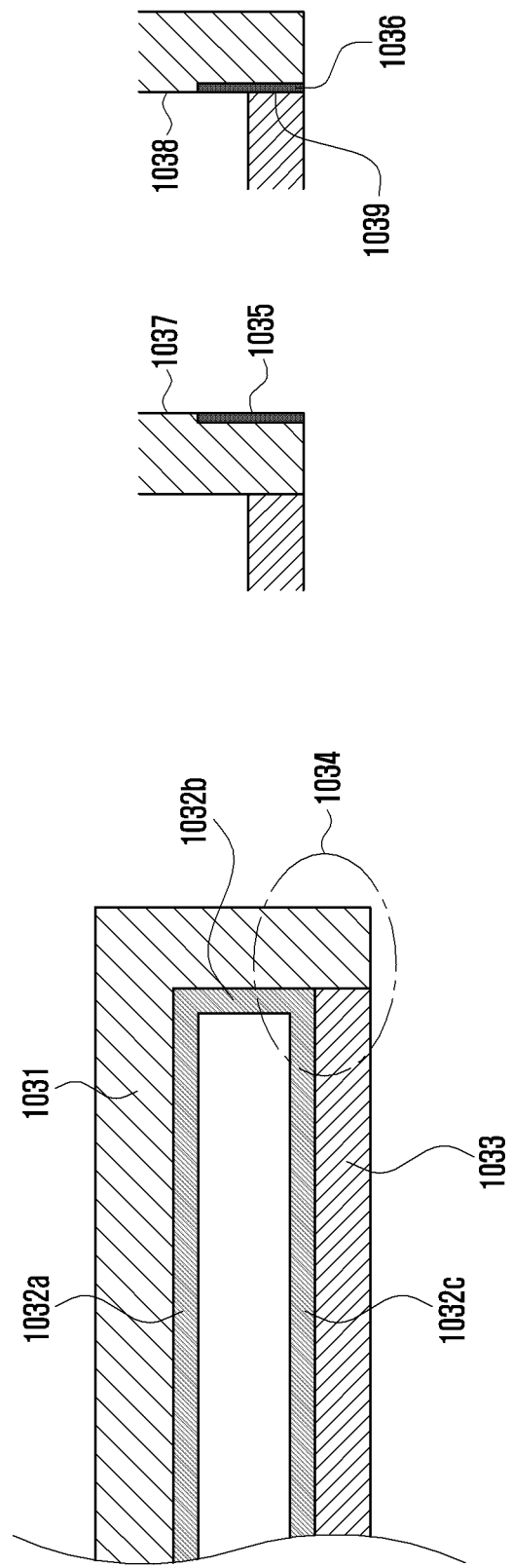

With reference to FIG. 10E, at a front surface of flexible display areas 1032a and 1032b that cover an upper surface and a side surface of the first housing 1001, a first window 1031 may be mounted; and, at a front surface of a flexible display area 1032c that covers a lower surface of the first housing 1001 and an upper surface of the second housing 1002, a second window 1033 may be mounted. For example, the first window may be extended and mounted to the flexible display areas 1032a and 1032b that cover the upper surface and the side surface of the first housing and a boundary end surface 1034 of the second window. The second window may be attached to a front surface of the flexible display area 1032c that covers the lower surface of the first housing. A printed matter and/or a black matrix 1035 may be inserted into an outer surface 1037 of the first window. Alternatively, a printed matter and/or a black matrix 1036 may be inserted into an inner surface 1038 of the first window and a boundary end surface 1039 of the second window.

Figure 11A:
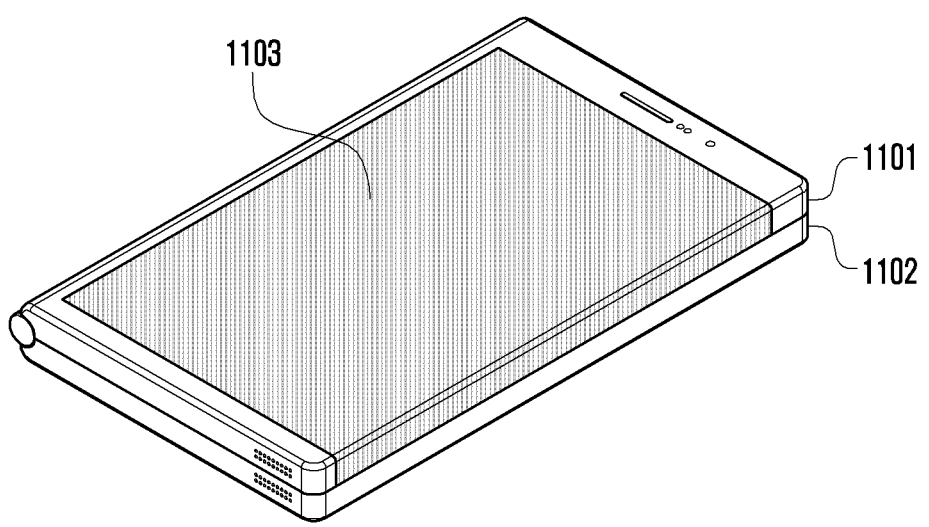
FIGS. 11A to 11C are diagrams illustrating another example of mounting a first window and a second window at a front surface of a flexible display in an electronic device according to various embodiments of the present invention.
Figure 11B:
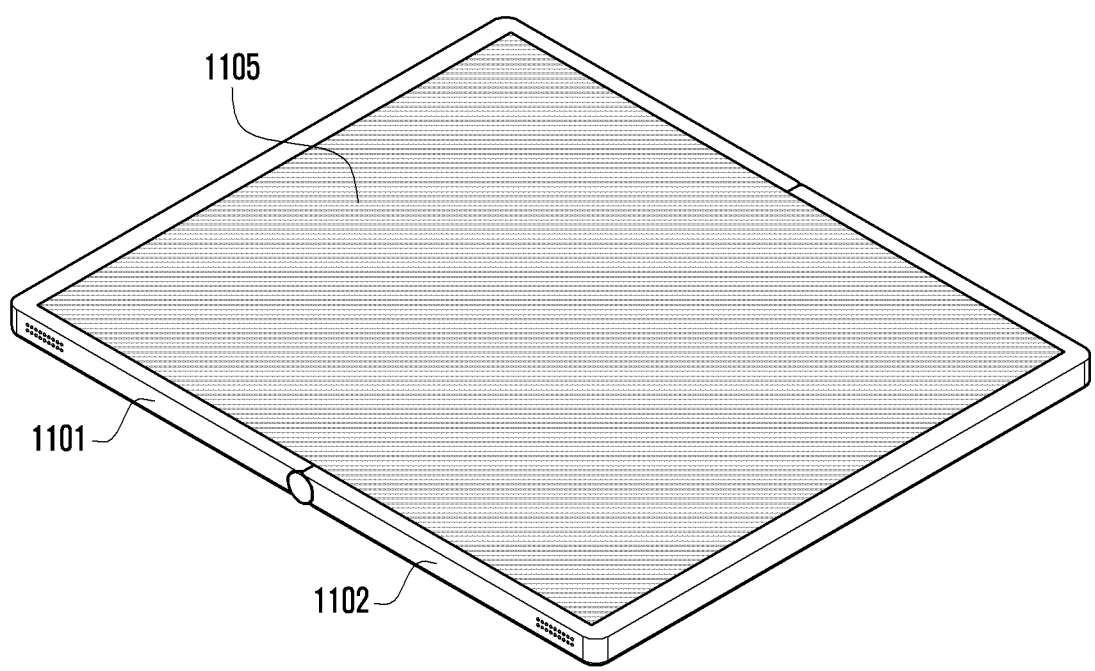
Figure 11C:
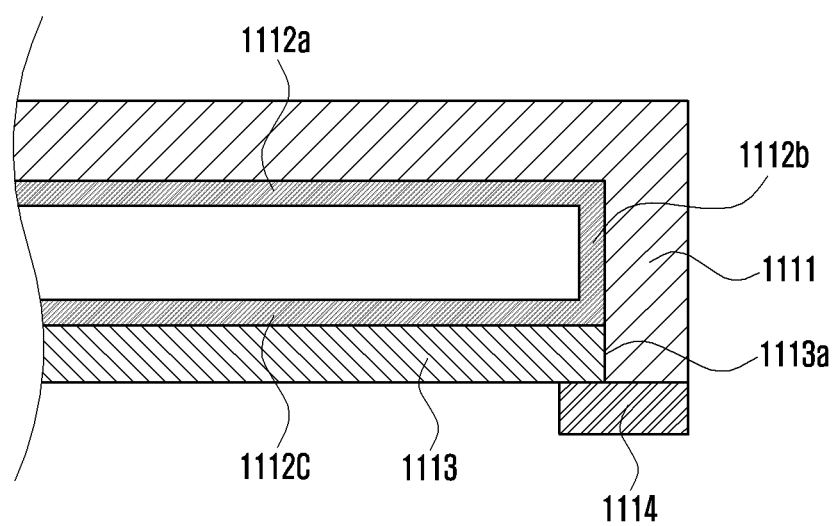

FIGS. 11A to 11C are diagrams illustrating another example of mounting a first window and a second window at a front surface of a flexible display in an electronic device according to various embodiments of the present invention.

FIG. 11a illustrates a state in which the electronic device is folded, and FIG. 11b illustrates a state in which the electronic device is unfolded. FIG. 11A illustrates a first housing 1101, a second housing 1102, and a first window 1103. A material of the first window 1103 may be, for example, plastic or glass. The first window 1103 may be exposed to the outside in a state in which the electronic device is folded to protect the flexible display from an external impact. FIG. 11B illustrates a first housing 1101, a second housing 1102, and a second window 1105. A material of the second window 1105 may be, for example, a film. The second window 1105 may be exposed to the outside in a state in which the electronic device is folded to protect the flexible display from an external impact.

FIG. 11C illustrates a cross-section of the electronic device in a folded state. With reference to FIG. 11C, a first window 1111 may be mounted in flexible display areas 1112a and 1112b that cover an upper surface and a lower surface of the first housing 1101 and a boundary end surface 1113a of a second window 1113. The second window 1113 may be mounted in a display area 1112c that covers the lower surface of the first housing 1101. At the interface of the first window 1111 and the second window 1113, a frame 1114 may be mounted.

Figure 12A:
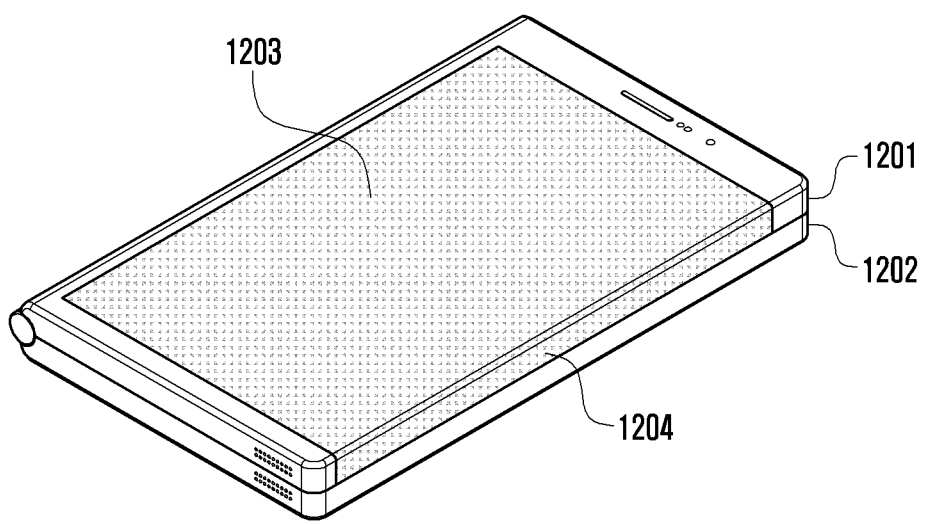
FIGS. 12A and 12B are diagrams illustrating an example of attaching a film window to a front surface of a flexible display in an electronic device according to various embodiments of the present invention.
Figure 12B:
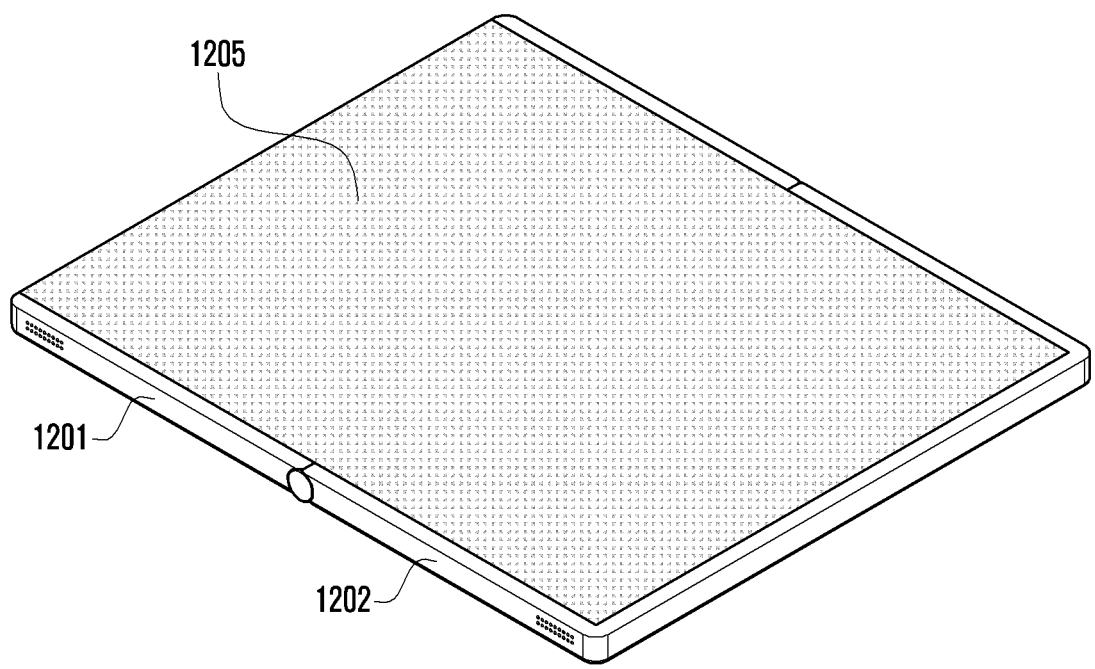

FIGS. 12A and 12B are diagrams illustrating an example of attaching a film window to a front surface of a flexible display in an electronic device according to various embodiments of the present invention.

FIG. 12A illustrates a state in which the electronic device is folded, and FIG. 12B illustrates a state in which the electronic device is unfolded. With reference to FIGS. 12A and 12B, in the entire area of front areas 1203, 1204, and 1205 of the flexible display, a window of a film material may be disposed, and in a state in which the electronic device is folded; a high hardness layer may be additionally formed at a front surface of the window of the film material disposed at a front surface of a flexible display area that covers an upper surface 1203 and a side surface 1204 of a first housing 1201 exposed to the outside.

FIGS. 13A to 13E are diagrams illustrating an example of forming various forms of protruding frames in a first housing in an electronic device according to various embodiments of the present invention.

The frame may be protruded relatively further than a window surface to protect the window upon impact.

Figure 13A:
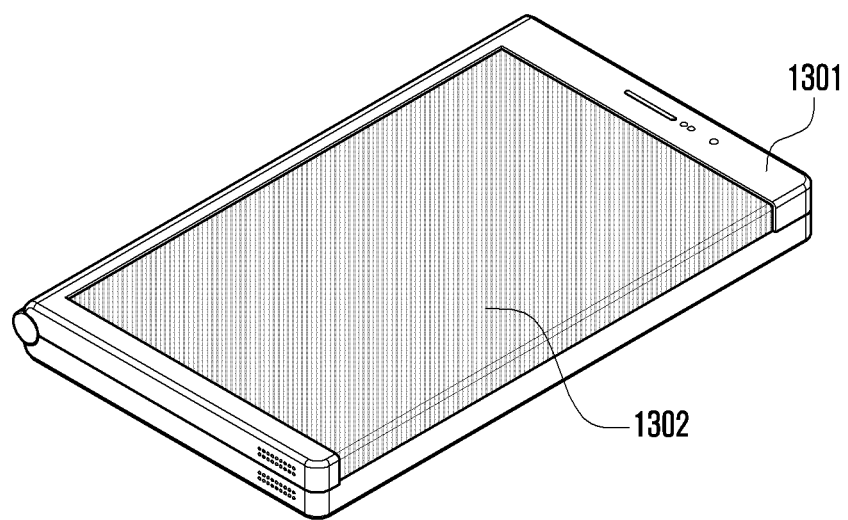
FIGS. 13A to 13E are diagrams illustrating an example of forming various forms of protruding frames in a first housing in an electronic device according to various embodiments of the present invention.

With reference to FIG. 13A, in a first housing 1301, a frame protruded relatively further than the window surface may be formed. One side surface of the frame may be open, and the window may be exposed to the outside in a state extended to the upper surface and the side surface of the first housing 1301.

Figure 13B:
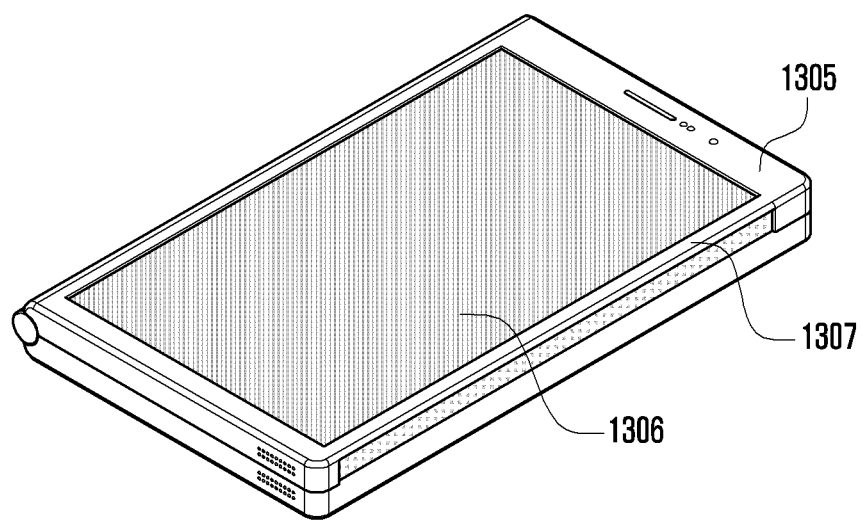

With reference to FIG. 13B, in a first housing 1305, a frame protruded relatively further than the window surface may be formed. At a point at which the upper surface and the side surface of the first housing 1305 meet, a bezel portion 1307 may be formed. At the upper surface of the first housing 1305, a partial area of the window may be exposed; and, at the side surface of the first housing 1305, a partial area of the window may be exposed.

Figure 13C:
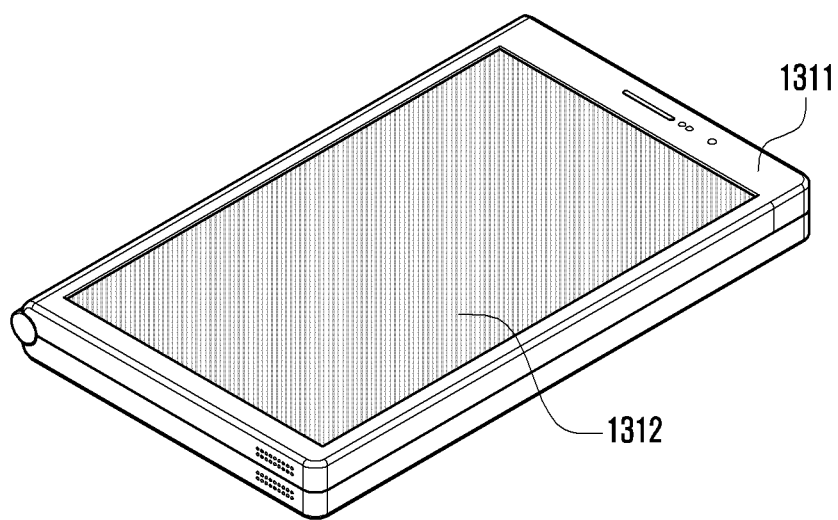

With reference to FIG. 13C, in a first housing 1311, a frame protruded relatively further than a surface of a window 1312 may be formed. The window 1312 may be exposed from the upper surface of the first housing 1311 to the outside and may not be exposed to the outside at the side surface.

Figure 13D:
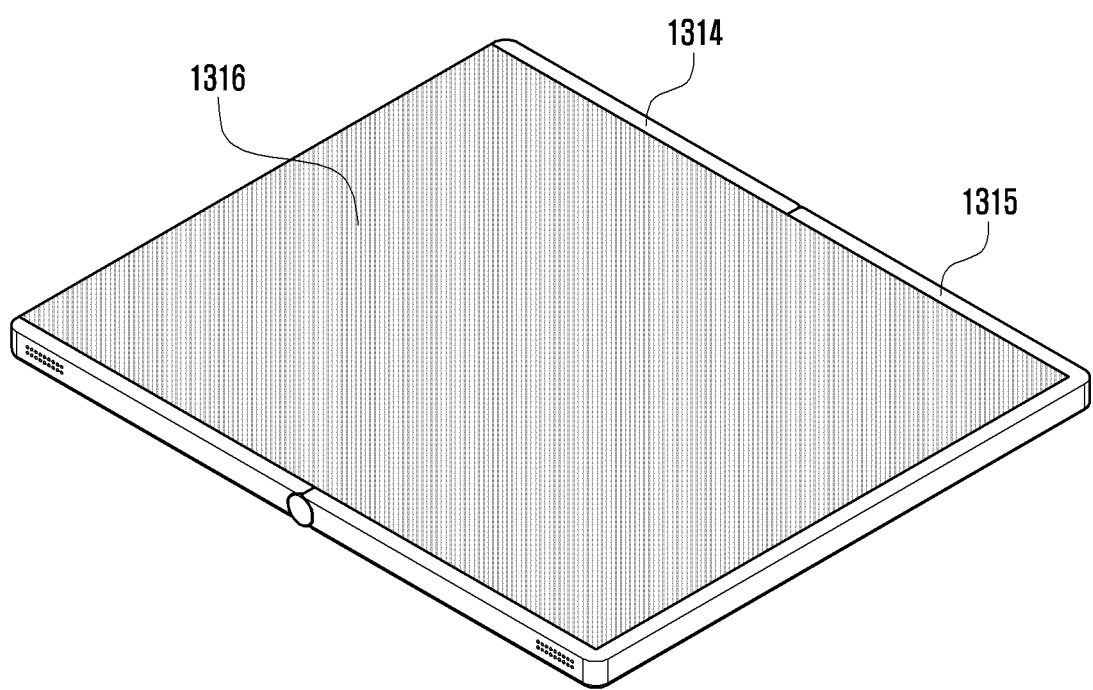

FIG. 13D illustrates a state in which the electronic device is unfolded. At a lower surface of a first housing 1314 and an upper surface of a second housing 1315, a window of a film material may be mounted. At one side surface of the first housing 1314, a bezel portion may not be formed.

Figure 13E:
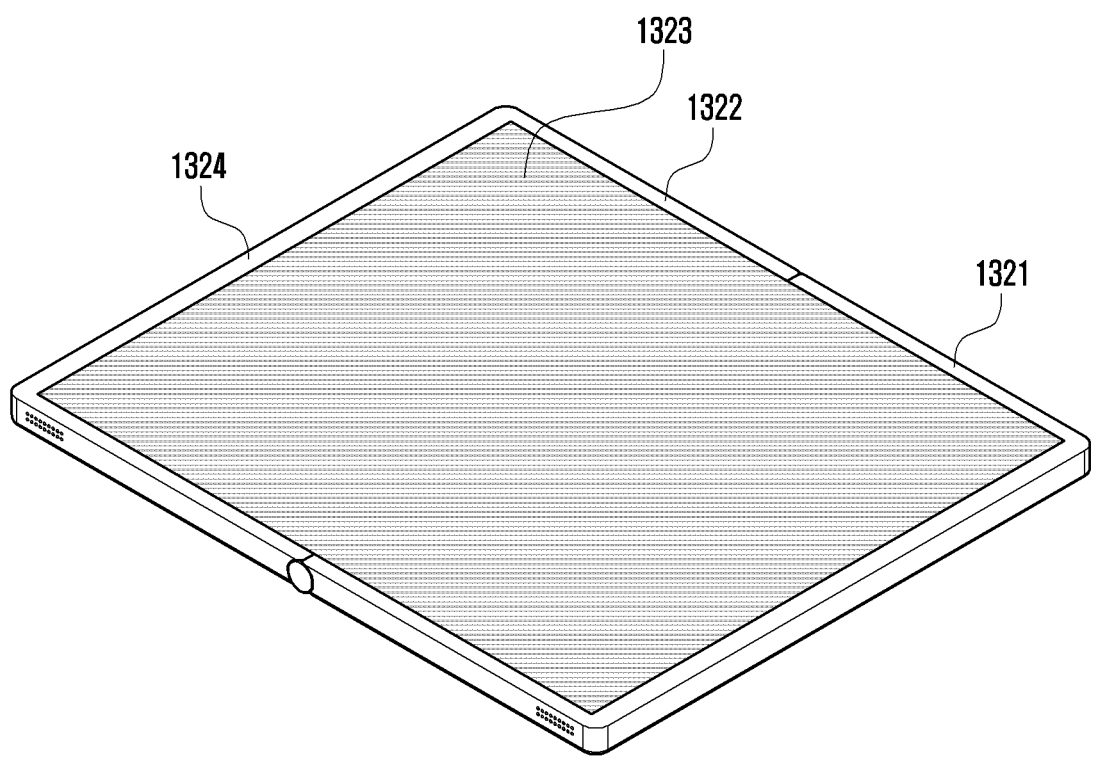

FIG. 13E illustrates a state in which the electronic device is unfolded. At a lower surface of the first housing 1314 and an upper surface of the second housing 1315, a window of a film material may be mounted. At one side surface of the first housing 1314, a bezel portion may be formed.

Figure 14A:
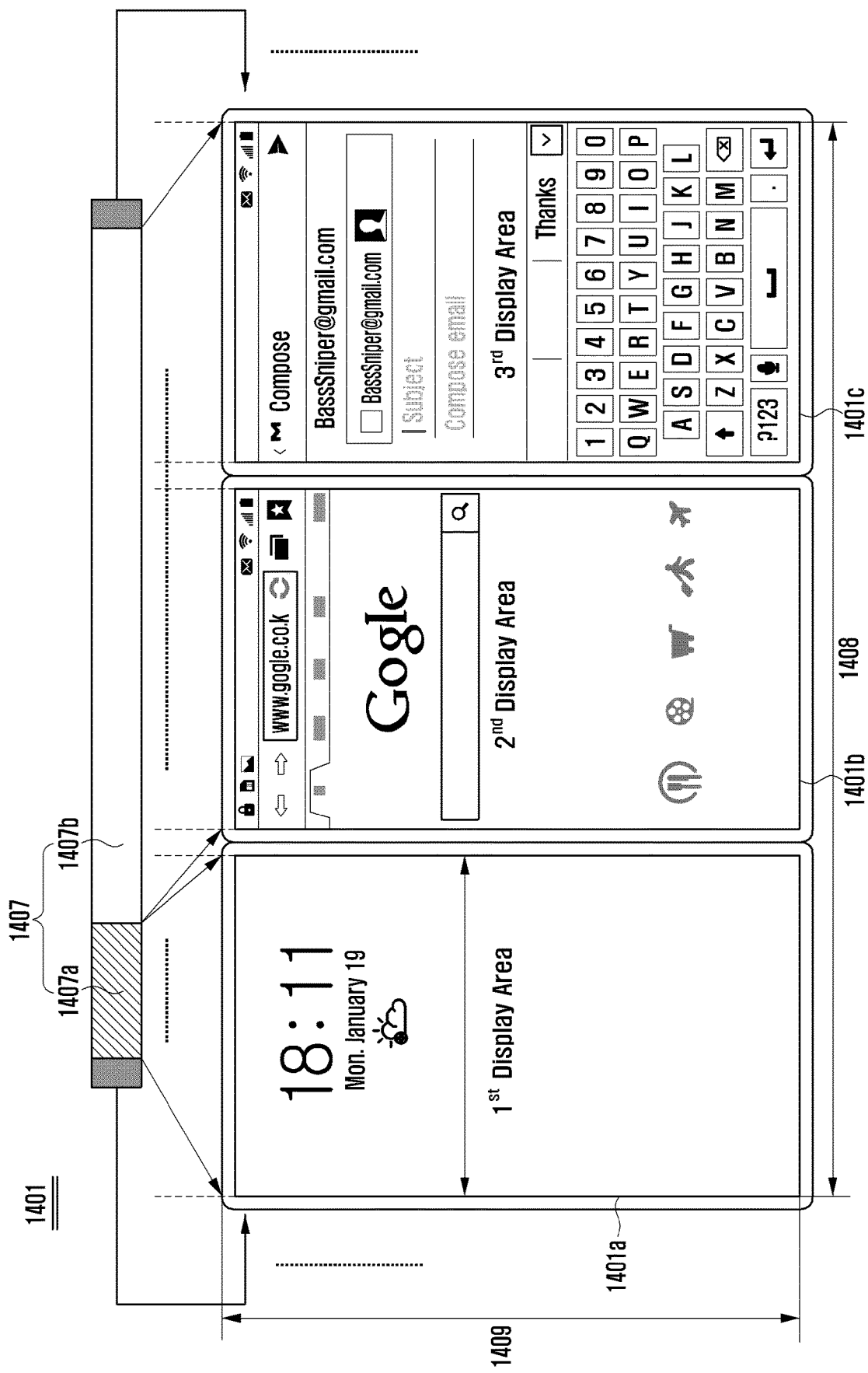
FIGS. 14A and 14B are diagrams illustrating an example of driving a flexible display of an electronic device according to various embodiments of the present invention.
Figure 14B:
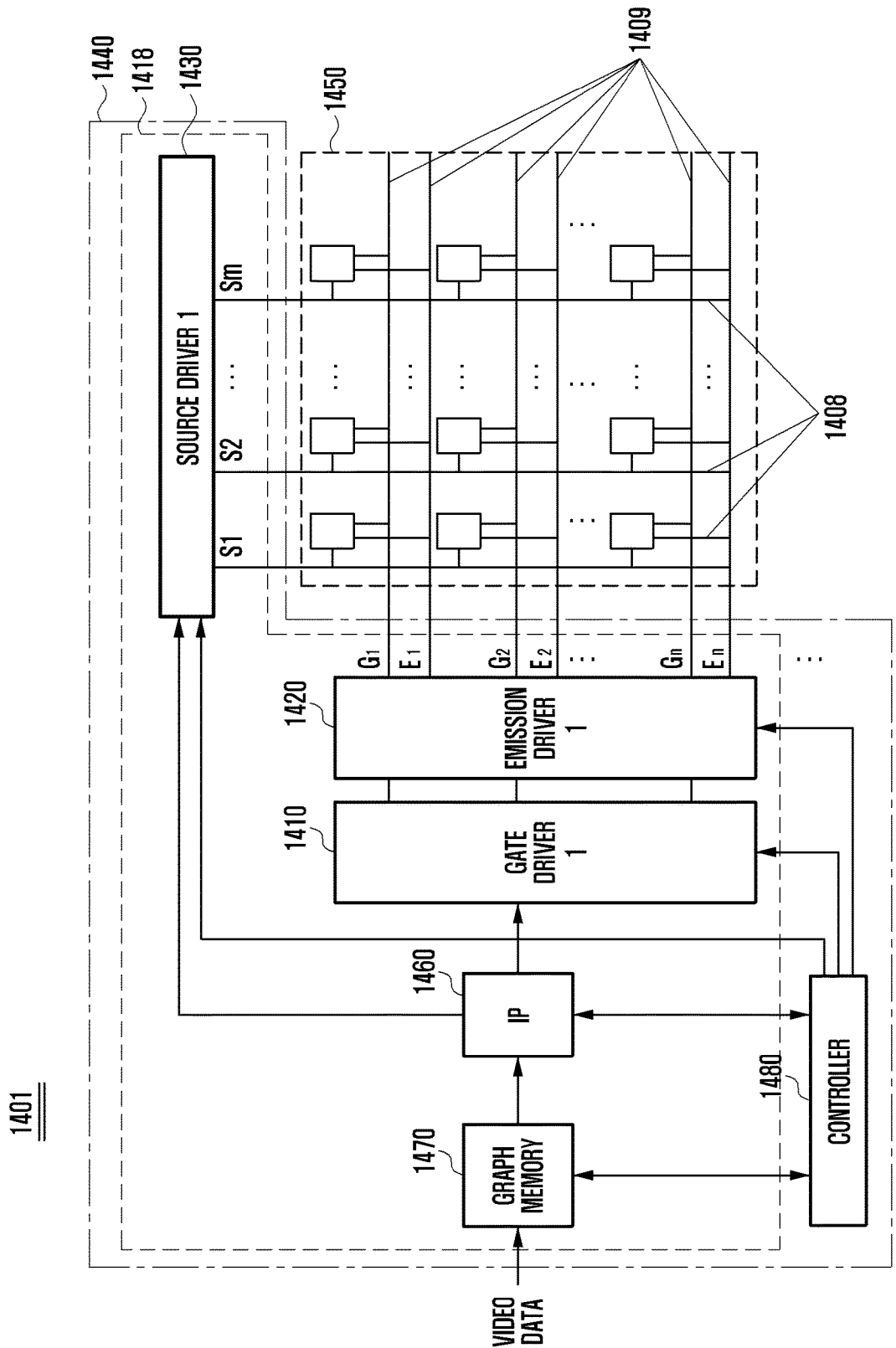

FIGS. 14A and 14B are diagrams illustrating an example of driving a flexible display of an electronic device according to various embodiments of the present invention.

The electronic device may include a single display driver circuit 1407 for driving the flexible display, and the display driver circuit may include a gate driver and a source driver. The electronic device may control the source driver to display a screen in an entire area or a partial area of the flexible display area corresponding to the first upper surface or to turn off a screen corresponding to the first lower surface and the second upper surface.

Alternatively, the electronic device may include a single display driver circuit 1407 for driving the flexible display, and the display driver circuit may include a gate driver and a source driver and control the gate driver to display a screen in the flexible display area corresponding to the first upper surface or to turn off a screen corresponding to the first lower surface and the second upper surface.

Alternatively, the electronic device may control a source driver or a gate driver to display a screen in the flexible display area corresponding to the first side surface.

According to an embodiment, the electronic device may display a screen in an area corresponding to a first upper surface, a first side surface, a first lower surface, and a second upper surface of the flexible display using a separate display driver circuit. The electronic device may include a first display driver circuit, a second display driver circuit, and a third display driver circuit. The first display driver circuit may control screen display of a flexible display area corresponding to the first upper surface, the second display driver circuit may control screen display of a flexible display area corresponding to the first side surface, and the third display driver circuit may control screen display of a flexible display area corresponding to the first lower surface and the second upper surface.

FIG. 14A illustrates a flexible display 1401 and a display driver circuit 1407 for controlling the flexible display panel 1401. The display driver circuit 1407 may be an integrated circuit called a display driver integrated circuit (IC) (DDI). According to an embodiment, the flexible display 1401 may further include a controller (not shown). The flexible display may include a first area 1401a, a second area 1401b, and a third area 1401c. In some embodiments, the flexible display may further include a fourth area (not shown) corresponding to side areas of the electronic device between the first area 1401a and the second area 1401b.

As shown in FIG. 7A, a first area and a second area of the flexible display may be fixed in a state bent to the outside and the second area and a third area thereof may be mounted in the electronic device in a state folded to the inside. Further, a fourth area that covers a side area of the first housing may be further included between the first area and the second area. In the following description, for convenience of description, it is described that the flexible display has only a first area, second area, and third area, but the present invention is not limited thereto.

In a state in which the electronic device is folded, the first area of the flexible display may be exposed to the outside; and, in a state in which the electronic device is unfolded, the second area and the third area of the flexible display may be exposed to the outside. In order to reduce power consumption of the electronic device, in a state in which the electronic device is folded, the electronic device may display a screen in only the first area of the flexible display and turn off a screen in the second area and the third area thereof. Further, in a state in which the electronic device is unfolded, the electronic device may turn off a screen in the first area of the flexible display and display a screen in only the second screen area and the third area thereof.

The display driver circuit 1407 may divide a source driver output thereof into a sub-area 1407a for controlling the first area 1401a of the flexible display and a main area 1407b for controlling the second area 1401b and the third area 1401c of the flexible display.

Hereinafter, an example of dividing and driving the first area 1401a, the second area 1401b, and the third area 1401c of the flexible display using a single driver circuit will be described in detail with reference to FIG. 14B.

With reference to FIG. 14B, a flexible display 1440 may include a display panel 1450 and a display driver circuit 1418 for controlling the display panel 1450. The display driver circuit 1418 may be an integrated circuit called a DDI. According to an embodiment, the flexible display 1440 may further include a controller 1480.

The display panel 1450 may include a pixel array (or a pixel group) configured with a plurality of pixels. The pixel array may convert an electrical signal into an optical signal and provide a display area that is used as a screen for displaying an image. Each pixel of the pixel array may be driven independently by the flexible display 1440. The display panel 1450 may include the same configuration as or a configuration similar to that of the display 160 and the panel 262.

The display driver circuit 1418 may be driven according to video data input to the display panel 1450. Such a display driver circuit 1418 may be used for processing video data input to the first area 1401a to the third area 1401c. Video data may be input from the electronic device using the display panel 1450. The flexible display 1440 may be included in the electronic device using the display panel 1450.

The display driver circuit 1418 may include a graphic memory 1470, image processor (IP) 1460, gate driver 1410, emission driver 1420, and source driver 1430. The graphic memory 1470 may buffer video data input from the electronic device 101. The IP 1460 may process to improve a screen quality of the video data buffered by the graphic memory 1470. In another example, a processing to improve a quality of the flexible display 1440 may not be required. In this case, the IP 1460 may not be included in the display driver circuit 1418 and may be omitted.

The gate driver 1410 (or the gate control circuit 1410) may scan and drive gate lines G1 to Gn connected to pixels corresponding to the longitudinal sides 1409 of the display panel 1450. That is, the gate driver 1410 may be connected to the first area 1401a to the third area 1401c to be used for controlling at least some pixels of the first area 1401a to the third area 1401c. The gate driver 1410 may sequentially select the gate lines G1 to Gn one by one to generate a gate control signal. The gate driver 1410 may be referred to as a "scan driver".

The emission driver 1420 (or the emission control circuit 1420) may drive emission lines E1 to Ep connected to pixels corresponding to the longitudinal sides 1409 of the display panel 1450. That is, the emission driver 1420 may be connected to the first area 1401a to the third area 1401c to be used for supplying power to at least some pixels of the first area 1401a to the third area 1401c. The emission driver 1420 may sequentially select the emission lines E1 to Ep one by one to generate an emission control signal for supplying power to the pixels.

The source driver 1430 (or the source control circuit 1430) may drive source lines Si to Sm connected to pixels corresponding to the transversal sides 1408 of the display panel 1450 to correspond to video data processed by the IP 1460. That is, the source driver 1430 may be connected to the first area 1401a to the third area 1401c to be used for providing data to at least some pixels. A driver such as the source driver 1430 may be referred to as a "data driver".

The electronic device may divide and control a source line of the source driver 1430 into a sub-area and a main area. For example, the electronic device may divide and drive the source line into a sub-area corresponding to a first area of the flexible display or a main area corresponding to a second area and a third area of the flexible display to selectively display a screen in the first area of the flexible display or the second area and the third area of the flexible display, thereby reducing power consumption.

Figure 15A:
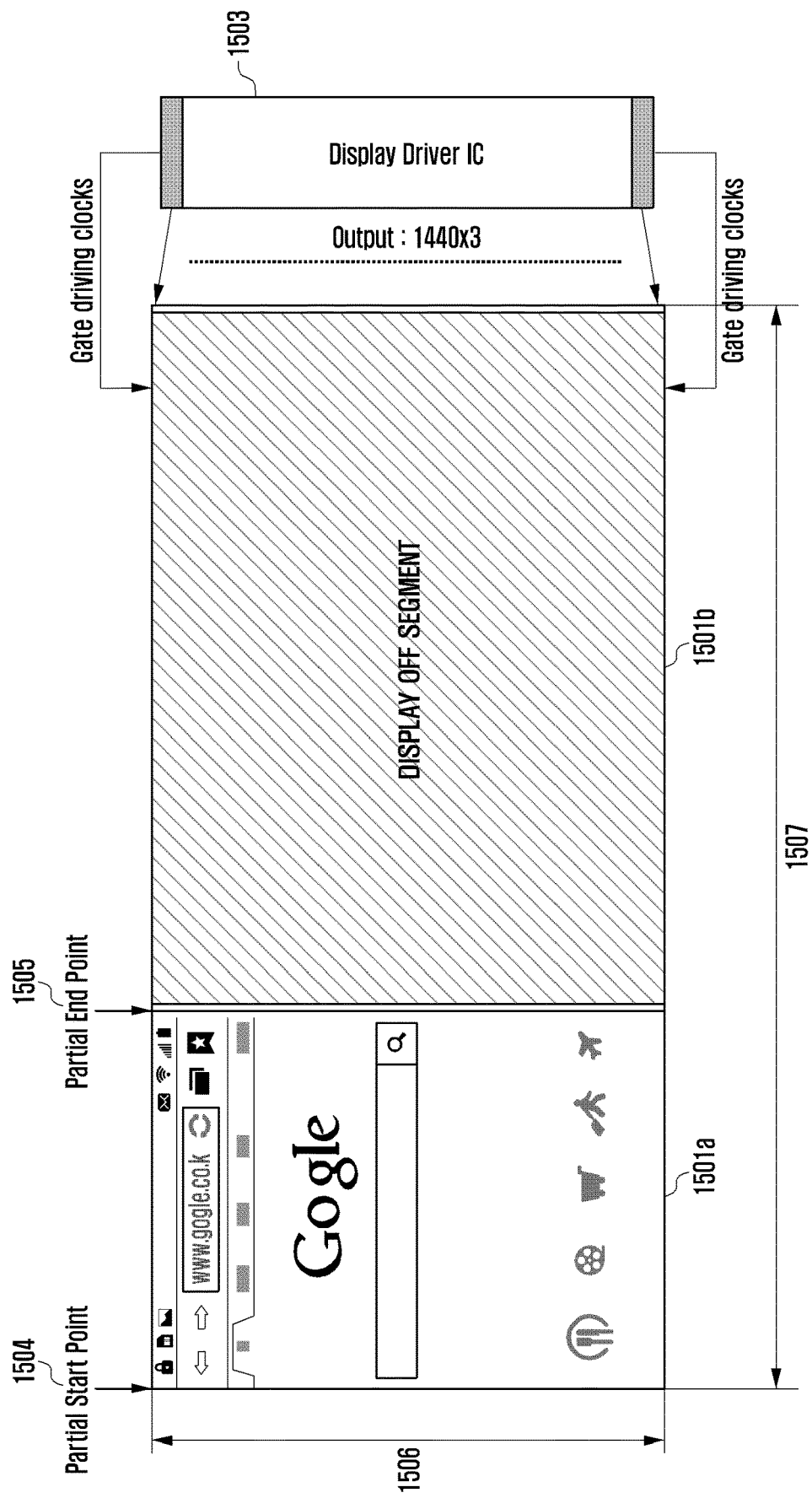
FIGS. 15A and 15B are diagrams illustrating another example of driving a flexible display of an electronic device according to various embodiments of the present invention.
Figure 15B:
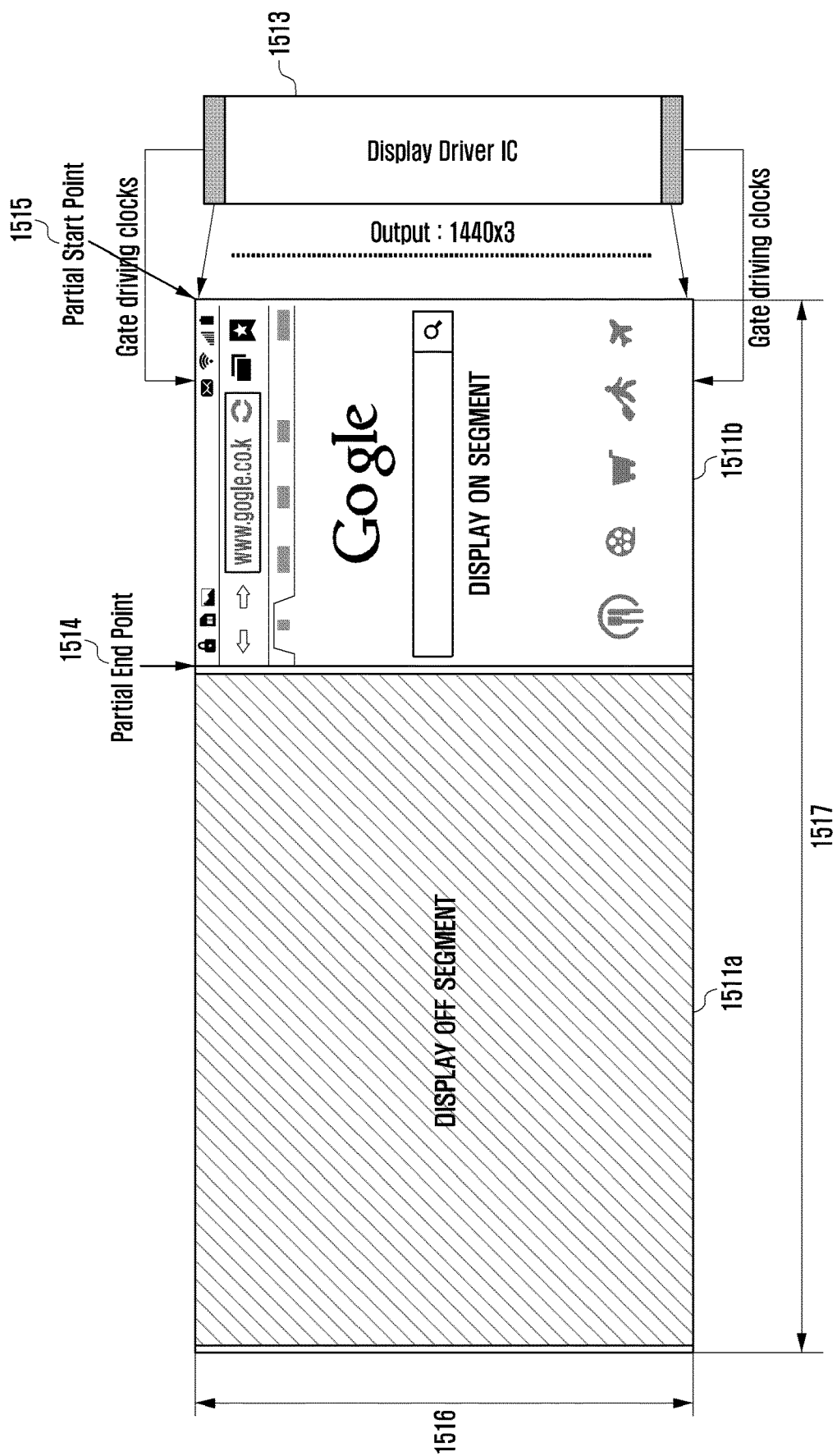

FIGS. 15A and 15B are diagrams illustrating another example of driving a flexible display of an electronic device according to various embodiments of the present invention.

FIG. 15A illustrates a flexible display 1501 and a display driver circuit 1503. In a state in which the electronic device is folded, the flexible display 1501 may include a first area 1501a exposed to the outside and a second area 1501b that is not exposed to the outside. In order to reduce power consumption, the electronic device may divide and control the first area 1501a and the second area 1501b.

The electronic device may connect and drive the source driver to pixels corresponding to the longitudinal sides 1506 of the flexible display and connect the gate driver to pixels corresponding to the transversal side 1507 of the flexible display, and partially drive the gate to selectively drive the first area 1501a or the second area 1501b of the flexible display.

For example, when displaying a screen in the first area 1501a of the flexible display and turning off a screen in the second area 1501b of the flexible display, the electronic device may drive gate lines corresponding to a start line 1504 to an end line 1505 to display a screen in the first area 1501a of the flexible display and may not drive gate lines corresponding to the second area 1501b of the flexible display to turn off a screen of the second area 1501b.

In some embodiments, the electronic device may further include an emission driver and, by connecting and selectively driving the emission driver to the pixels corresponding to the longitudinal sides 1506 of the flexible display, the electronic device may display a screen in the first area or the second area.

FIG. 15B illustrates a flexible display 1511 and a display driver circuit 1513. The flexible display 1511 may include a first area 1511a exposed to the outside and a second area 1511b that is not exposed to the outside in a state in which the electronic device is folded. In order to reduce power consumption, the electronic device may divide and control the first area 1511a and the second area 1511b.

The electronic device may connect and drive a source driver to pixels corresponding to the longitudinal side 1516 of the flexible display, connect a gate driver to pixels corresponding to the transversal side 1517 of the flexible display, and partially drive the gate to selectively drive the first area 1511a or the second area 1511b of the flexible display.

For example, when turning off a screen in the first area 1511a of the flexible display and displaying a screen in the second area 1511*b* of the flexible display, the electronic device may set the right side of the flexible display as a start line 1515 and drive gate lines corresponding to the start line 1515 to an end line 1514 to display a screen in the second area 1511*b* of the flexible display and not drive the gate lines corresponding to the first area 1511*a* of the flexible display to turn off a screen of the first area 1511*a*.

In some embodiments, the electronic device may further include an emission driver and connect and selectively drive the emission driver to pixels corresponding to the longitudinal side 1516 of the flexible display to display a screen in the first area or the second area.

Figure 16A:
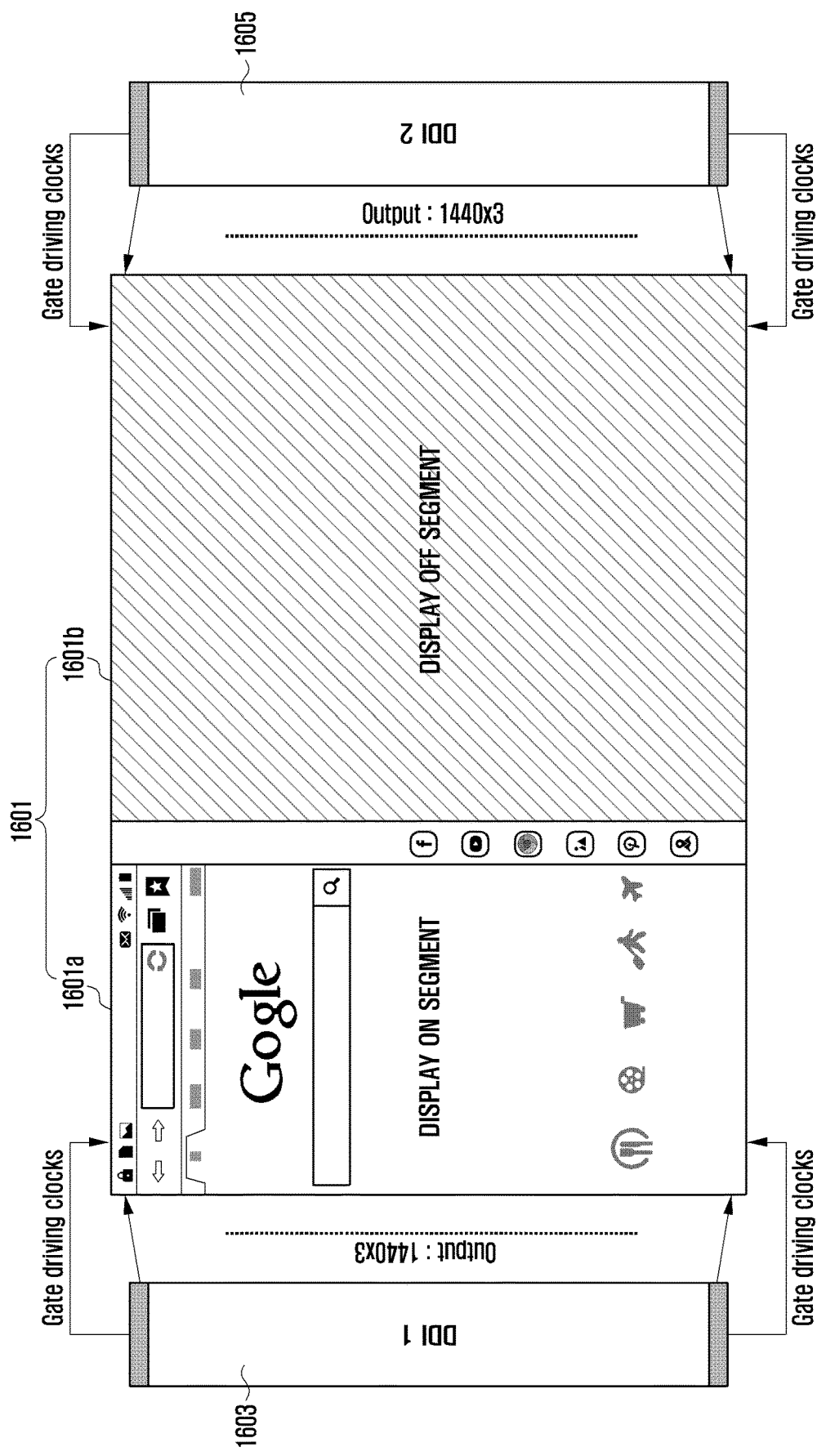
FIGS. 16A to 16C are diagrams illustrating an example of driving a flexible display of an electronic device using two display driver circuits according to various embodiments.
Figure 16B:
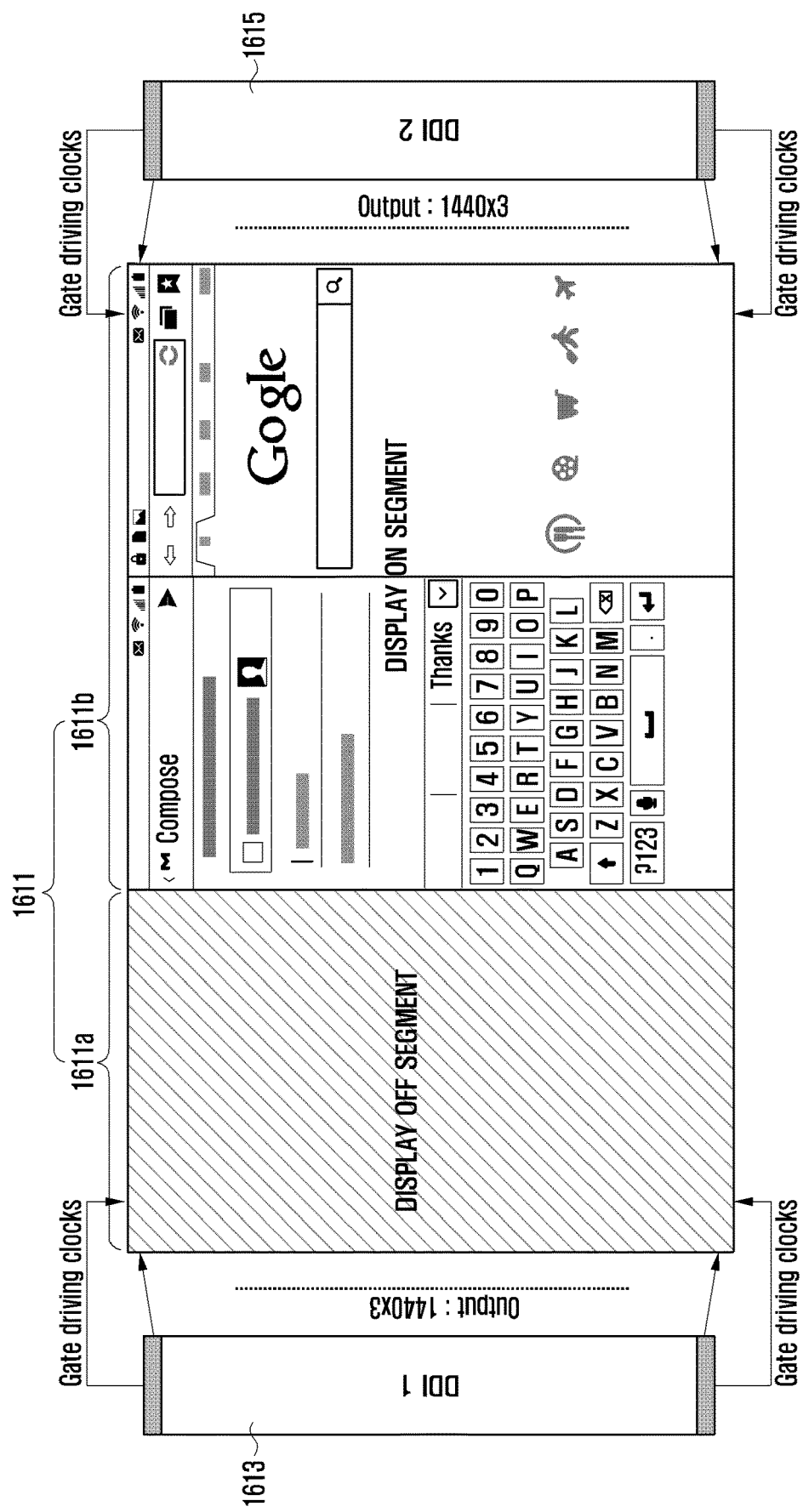
Figure 16C:
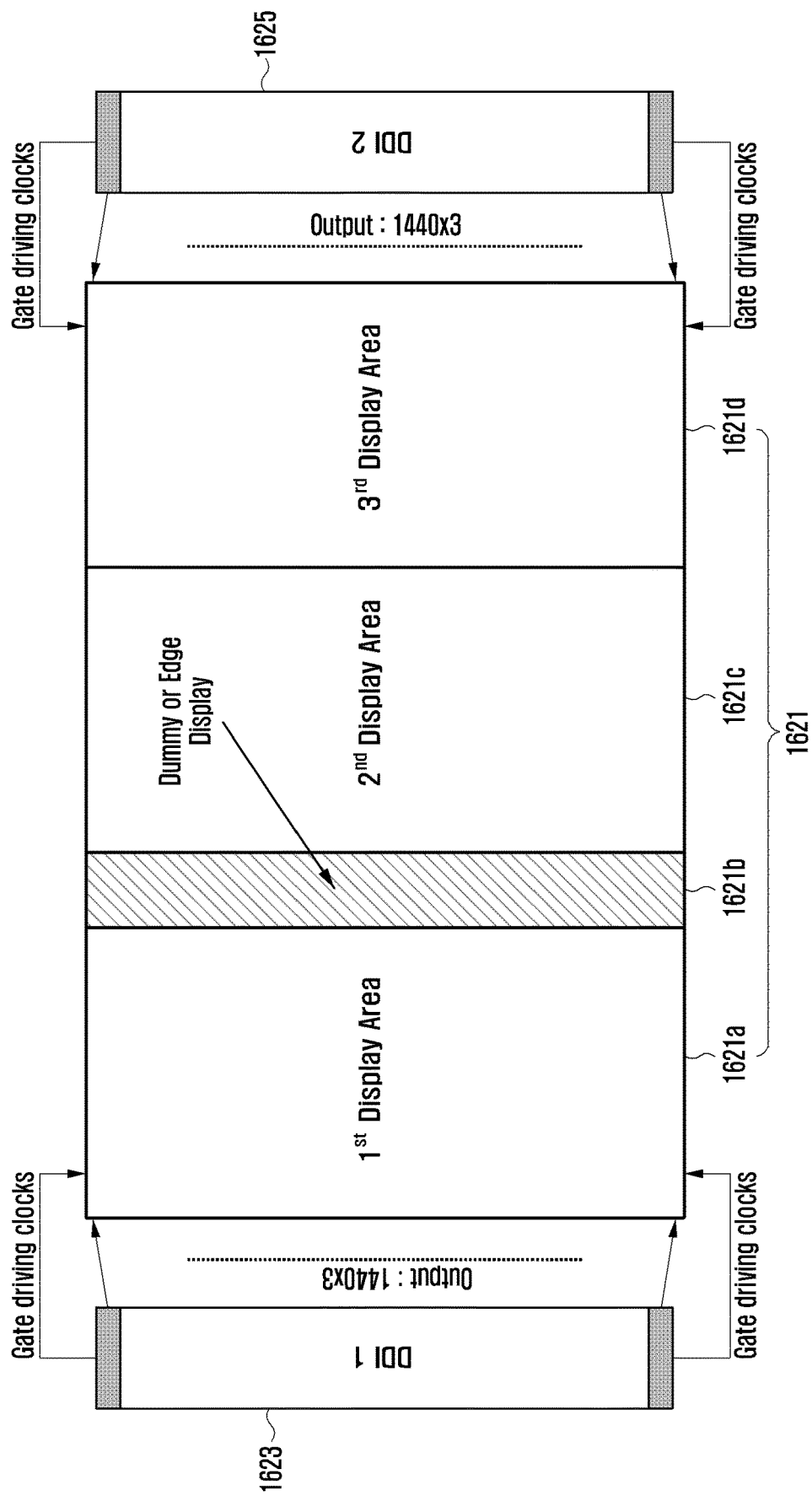

FIGS. 16A to 16C are diagrams illustrating an example of driving a flexible display of an electronic device using two display driver circuits according to various embodiments.

FIG. 16A illustrates a flexible display 1601, a first display driver circuit 1603, and a second display driver circuit 1605. In a state in which the electronic device is folded, a first area 1601*a* of the flexible display may be exposed to the outside and a second area 1601*b* thereof may not be exposed to the outside. In a state in which the electronic device is unfolded, the second area 1601*b* may be exposed to the outside.

The first display driver circuit 1603 may display a screen in the first area 1601*a* of the flexible display, and the second display driver circuit 1605 may display a screen in the second area 1601*b* of the flexible display. In a state in which the electronic device is folded, the first display driver circuit 1603 may display a screen in the first area 1601*a* of the flexible display, and the second display driver circuit 1605 may turn off a screen in the second area 1601*b* of the flexible display.

FIG. 16B illustrates a flexible display 1611, a first display driver circuit 1613, and a second display driver circuit 1615. In a state in which the electronic device is folded, a first area 1611*a* of the flexible display may be exposed to the outside and a second area 1611*b* thereof may not be exposed to the outside. In a state in which the electronic device is unfolded, the second area 1611*b* may be exposed to the outside.

The first display driver circuit 1613 may display a screen in the first area 1611*a* of the flexible display, and the second display driver circuit 1615 may display a screen in the second area 1611*b* of the flexible display. In a state in which the electronic device is unfolded, the first display driver circuit 1613 may turn off a screen in the first area 1611*a* of the flexible display, and the second display driver circuit 1615 may display on a screen in the second area 1611*b* of the flexible display.

FIG. 16C illustrates a flexible display 1621, a first display driver circuit 1623, and a second display driver circuit 1625. In a state in which the electronic device is folded, a first area 1621*a* and a second area 1621*b* of the flexible display 1621 may be exposed to the outside and a third area 1621*c* and a fourth area 1621*d* thereof may not be exposed to the outside. The second area may be used as a side display area. In some embodiments, the second area may be used as a dummy display area.

The first display driver circuit 1623 may display a screen in the first area 1621*a* and the second area 1621*b* of the flexible display 1621, and the second display driver circuit 1625 may display a screen in the third area 1621*c* and the fourth area 1621*d* of the flexible display 1621. In a state in which the electronic device is folded, the first display driver circuit 1623 may display a screen in the first area 1621*a* and the second area 1621*b* of the flexible display 1621, and the second display driver circuit 1625 may turn off a screen in the third area 1621*c* and the fourth area 1621*d* of the flexible display 1621.

In a state in which the electronic device is unfolded, the first display driver circuit 1623 may turn off a screen in the first area 1621*a* and the second area 1621*b* of the flexible display 1621, and the second display driver circuit 1625 may display a screen in the third area 1621*c* and the fourth area 1621*d* of the flexible display 1621.

The foregoing elements of an electronic device may each be formed with at least one component, and a name of a corresponding element may be changed according to a kind of the electronic device. In various embodiments, the electronic device may include at least one of the foregoing elements and may omit some elements or may further include additional other elements. Further, as some of elements of an electronic device according to various embodiments are coupled to form a single entity, the single entity may equally perform a function of corresponding elements before coupling.

A term "module" used in this document may be a unit including a combination of at least one of, for example, hardware, software, or firmware. The "module" may be interchangeably used with a term such as a unit, logic, a logical block, a component, or a circuit. The "module" may be a minimum unit of an integrally formed component or a portion thereof. The "module" may be a minimum unit that performs at least one function or a portion thereof. The "module" may be mechanically or electronically implemented. For example, a "module" according to an embodiment of the present invention may include at least one of an application-specific integrated circuit (ASIC) chip field-programmable gate array (FPGA), a programmable-logic device that performs any operation that is known or is to be developed in the future.

At least a portion of a method (e.g., operations) or a device (e.g., modules or functions thereof) according to various embodiments may be implemented with an instruction stored at computer readable storage media in a form of, for example, a programming module. When the instruction is executed by a processor (e.g., the processor 120), the at least one processor may perform a function corresponding to the instruction. The computer readable storage media may be, for example, the memory 130.

The computer readable recording medium may include a hard disk, floppy disk, magnetic media (e.g., magnetic tape), optical media (e.g., compact disc read only memory (CD-ROM), digital versatile disc (DVD)), magneto-optical media (e.g., floptical disk), and a hardware device (e.g., read only memory (ROM), random access memory (RAM), or flash memory). Further, a program command may include a high-level language code that may be executed by a computer using an interpreter as well as a machine language code generated by a compiler. In order to perform operations of various embodiments, the above-described hardware device may be configured to operate as at least one software module and vice versa.

A module or a program module according to various embodiments may include at least one of the foregoing elements, may omit some elements, or may further include additional other elements. Operations performed by a module, a program module, or another constituent element according to various embodiments may be executed with a sequential, parallel, repeated, or heuristic method. Further, some operations may be executed in different orders, may be omitted, or may add other operations.

According to various embodiments of the present invention, in a storage medium that stores commands, when being executed by at least one processor, the commands are configured to enable the at least one processor to perform at least one operation, and the at least one operation may include an operation of obtaining an image and an operation of outputting a message generated based on an analysis result of the obtained image and additional information.

Embodiments disclosed in this document are suggested for description and understanding of technology contents and do not limit the scope of the present disclosure. Therefore, it should be analyzed that a range of the present disclosure includes all changes or various other embodiments based on the scope and spirit of the present disclosure.

The invention claimed is:

1. An electronic device, comprising:
   a first housing comprising a first upper surface, a first lower surface, a first side surface, and a second side surface disposed at the opposite side of the first side surface;
   a second housing comprising a third side surface and a second upper surface;
   a connection member configured to rotatably connect the first housing and the second housing;
   a first window formed with the first upper surface and made of a first material;
   a second window extended from the first lower surface to the second upper surface and made of a second material, the second window being foldable; and
   a flexible display mounted in the first housing and the second housing, wherein the flexible display is extended from the first window to the second window and a screen output from the flexible display is viewable through at least one of the first window and the second window,
   wherein at least part of the first housing including the first side surface abuts both the first window and the second window and the at least part of the first housing includes an opaque region, and
   wherein the first material is different from and harder than the second material.

2. The electronic device of claim 1, wherein the first material is harder than the second material.

3. The electronic device of claim 1, wherein the first material comprises plastic or glass, and the second material comprises a film.

4. The electronic device of claim 1, wherein at least a partial area of the second window corresponding to a connection area of the second side surface and the third side surface is folded according to a rotation of the first housing and the second housing by the connection member.

5. The electronic device of claim 1, wherein a plane of the first window is positioned lower than that of the first housing.

6. The electronic device of claim 1, wherein an area of the flexible display corresponding to the first side surface is fixed to a form bent to the outside to be mounted in the first side surface.

7. The electronic device of claim 6, wherein an area of the flexible display corresponding to the second side surface and the third side surface is mounted in the first lower surface and the second upper surface so as to fold.

8. The electronic device of claim 1, wherein, in at least a partial area of the first upper surface, a keyboard is mounted.

9. The electronic device of claim 1, wherein the connection member is integrally formed with the first housing or the second housing.

10. The electronic device of claim 1, wherein the electronic device has a folding state in which the first lower surface of the first housing and the second upper surface of the second housing are folded to face about the connection member or an unfolding state in which the first lower surface of the first housing and the second upper surface of the second housing are unfolded to position on a single plane.

11. The electronic device of claim 10, wherein, in a state in which the electronic device is folded, a flexible display area corresponding to the first upper surface and the first side surface is exposed to the outside.

12. The electronic device of claim 10, wherein, in a state in which the electronic device is folded, the electronic device is configured to activate a screen in at least a portion of a flexible display area corresponding to the first upper surface and to deactivate a screen in a flexible display area corresponding to the first lower surface and the second upper surface.

13. The electronic device of claim 10, wherein, in a state in which the electronic device is folded, the electronic device is configured to activate a flexible display area corresponding to the first side surface and to deactivate a flexible display area corresponding to the first lower surface and the second upper surface.

14. The electronic device of claim 10, further comprising:
   a single display driver circuit configured to drive the flexible display, wherein the display driver circuit comprises a gate driver and a source driver; and
   a processor, wherein the processor is configured to activate a flexible display area corresponding to the first upper surface using the source driver and to deactivate a screen corresponding to the first lower surface and the second upper surface using the source driver.

15. The electronic device of claim 10, further comprising a single display driver circuit configured to drive the flexible display,
   wherein the display driver circuit comprises a gate driver and a source driver, and
   wherein the electronic device is configured to activate a screen in a flexible display area corresponding to the first upper surface and to deactivate a screen corresponding to the first lower surface and the second upper surface using the gate driver.

16. The electronic device of claim 10, further comprising a first display driver circuit and a second display driver circuit configured to drive the flexible display,
   wherein the electronic device is configured to activate a screen in a flexible display area corresponding to the first upper surface using the first display driver circuit, and
   the electronic device is configured to deactivate a screen corresponding to the first lower surface and the second upper surface using the second display driver circuit.

17. The electronic device of claim 16, wherein the first display driver circuit is configured to activate a screen in a flexible display screen area corresponding to the first side surface.

18. An electronic device, comprising:
   a first housing comprising a first upper surface, a first side surface, and a first lower surface;
   a second housing rotatably connected to the first housing and comprising a second upper surface;
   a flexible display mounted to cover the first upper surface, the first lower surface, and the first side surface of the first housing and the second upper surface of the second housing;
   a first window configured to cover a sub-area of the flexible display corresponding to the first upper surface and the first side surface of the first housing; and
   a second window configured to cover a main area of the flexible display corresponding to the first lower surface of the first housing and the second upper surface of the second housing, wherein the second window is foldable, and a first material of the first window is different from and harder than a second material of the second window, wherein at least part of the first housing including the first side surface abuts both the first window and the second window and the at least part of the first housing includes an opaque region, and wherein the flexible display is extended from the first window to the second window and a screen output from the flexible display is viewable through at least one of the first window and the second window.

19. The electronic device of claim 18, wherein the sub-area and the main area are driven independently.

\* \* \* \* \*